United States Patent
Suzuki

(10) Patent No.: US 8,351,708 B2
(45) Date of Patent: Jan. 8, 2013

(54) INFORMATION PROCESSING APPARATUS, INFORMATION PROCESSING METHOD, COMPUTER PROGRAM, AND RECORDING MEDIUM

(75) Inventor: Hirotaka Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 12/325,493

(22) Filed: Dec. 1, 2008

(65) Prior Publication Data

US 2009/0141982 A1    Jun. 4, 2009

(30) Foreign Application Priority Data

Dec. 3, 2007 (JP) ................................. 2007-312568

(51) Int. Cl.
*G06K 9/46* (2006.01)
*G06K 9/62* (2006.01)
(52) U.S. Cl. .................... 382/201; 382/225; 382/107
(58) Field of Classification Search .................. 382/103, 382/201, 225, 107; 348/77
See application file for complete search history.

(56) References Cited

U.S. PATENT DOCUMENTS

| 2004/0120581 A1* | 6/2004 | Ozer et al. ................... 382/224 |
| 2005/0213818 A1 | 9/2005 | Suzuki et al. |
| 2006/0153457 A1 | 7/2006 | Nakamura et al. |
| 2007/0025722 A1* | 2/2007 | Matsugu et al. .............. 396/263 |
| 2009/0041340 A1 | 2/2009 | Suzuki et al. |

FOREIGN PATENT DOCUMENTS

| JP | 8-279044 | 10/1996 |
| JP | 2781743 | 5/1998 |

OTHER PUBLICATIONS

Laptev et al. "Space-Time Interest Points." Proceedings, 9th International Conference on Computer Vision, vol. 1, Oct. 13, 2003, pp. 432-439.*

* cited by examiner

*Primary Examiner* — Jon Chang
(74) *Attorney, Agent, or Firm* — Oblon, Spivak, McClelland, Maier & Neustadt, L.L.P.

(57) ABSTRACT

An information processing apparatus includes a storing unit that stores information concerning model feature points and model feature quantities at the model feature points, a first acquiring unit that acquires an input moving image, a first feature-point extracting unit that extracts input feature points for recognizing an action from the input moving image, a first feature-quantity extracting unit that extracts input feature quantities at the input feature points, a feature-quantity comparing unit that compares the input feature quantities and the model feature quantities and generates candidate corresponding feature point pairs, a posture estimating unit that removes outliers from the candidate corresponding feature point pairs, estimates postures of models on the input moving image, and obtains a recognition corresponding feature point pair group corresponding to the postures, and a recognition-result generating unit that generates a recognition result on the basis of the recognition corresponding feature point pair group.

29 Claims, 9 Drawing Sheets

FIG. 4
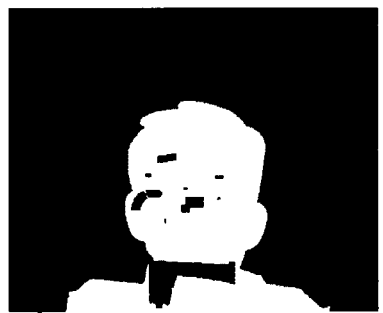
111 IMAGE AFTER THRESHOLD PROCESSING
112 IMAGE AFTER MORPHOLOGICAL EXPANSION
FIG. 5
121 IMAGE AFTER MEDIAN FILTERING (MASK IMAGE 1)
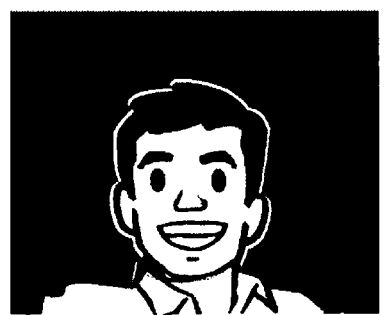
122 IMAGE AT TIME t OF MODEL MOVING IMAGE AFTER BACKGROUND SEPARATION PROCESSING
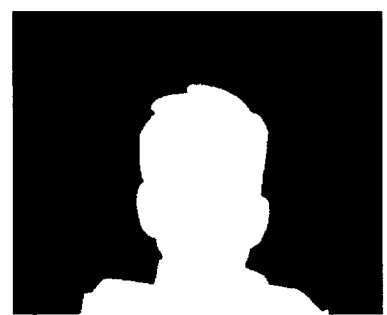
123 IMAGE AFTER MORPHOLOGICAL CONTRACTION (MASK IMAGE 2)

INFORMATION PROCESSING APPARATUS, INFORMATION PROCESSING METHOD, COMPUTER PROGRAM, AND RECORDING MEDIUM

CROSS-REFERENCES TO RELATED APPLICATIONS

The present invention contains subject matter related to Japanese Patent Application JP 2007-312568 filed in the Japanese Patent Office on Dec. 3, 2007, the entire contents of which being incorporated herein by reference.

BACKGROUND OF THE INVENTION

1. Field of the Invention

The present invention relates to an information processing apparatus, an information processing method, a computer program, and recording medium, and, more particularly to an information processing apparatus, an information processing method, a computer program, and a recording medium suitably used in detecting the motion of an object.

2. Description of the Related Art

Various methods have been used to acquire moving image data and detect the motion of an object.

There are proposed a large number of methods of identifying, from acquired moving image data, positions of specific body parts such as hands and feet of an object, which should be recognized, and recognizing actions from motion information of the body parts. Specifically, there are, for example, a method of using special equipment for identifying body parts (see, for example, Japanese Patent No. 2558943or Japanese Patent No. 3144400), a method of performing template matching (see, for example, Japanese Patent No. 2781743 or JP-A-8-279044), and a method of identifying body parts using color information or contour information (see, for example, U.S. Pat. No. 625,600B1, Japanese Patent No. 2868449, Japanese Patent No. 2934190, Japanese Patent No. 3440644, JP-A-10-214346, JP-A-2003-039365, JP-A-2003-216955, or Japanese Patent No. 2868449).

There is also proposed a method of extracting a motion area according to temporal subtraction or optical flow and recognizing actions from a center-of-gravity temporal change pattern of the area (see, for example, U.S. Pat. No. 6,681,031B2)).

There is also proposed a method of preparing, for an action desired to be recognized (a model action), a large amount of motion images for learning in which the action is imaged, extracting a feature quantity group that describes space-time events from the respective moving images, and performing learning using a statistical learning method such as a support vector machine to thereby obtain feature quantities for satisfactorily separating the model action from other space-time patterns out of the feature quantity group, and, in recognizing the model action from an input moving image during recognition processing, judging presence or absence of detection using only the feature quantity obtained by the learning (see, for example, C. Schuldt, I. Laptev, and B. Caputo, Recognizing human actions: a local SVM approach, In ICPR, pages III: 3236, 20).

SUMMARY OF THE INVENTION

However, the method of identifying, from acquired moving image data, positions of specific body parts such as hands and feet of an object, which should be recognized, and recognizing actions from motion information of the body parts is limitedly performed for body parts that can be recognized. Recognition algorithms specialized for the respective actions are necessary for the method. In other words, since a detection algorithm is completely different for each of the body parts and each of the actions, it is difficult to allow a user to later recognize an action not assumed during system design. Specifically, for example, it is difficult for the user to later arbitrarily register actions performed by using objects, actions performed by using other body parts, cooperative actions by plural persons and recognize those actions.

Even if the method of extracting a motion area according to temporal subtraction or optical flow, only the center-of-gravity temporal change pattern is not information sufficient for dividing various gestures. In an actual environment in which images including a background and the like are acquired, it is difficult to improve accuracy of extraction of a motion area. Moreover, when a motion area, which should be recognized, is partially blocked, it is anticipated that the center of gravity position deviates from an original position and high recognition accuracy is not realized.

When the statistical learning is used, it is possible to later recognize actions not assumed during system design. However, a large amount of moving images for learning are necessary to learn a feature quantity suitable for the recognition. For example, when the user desires to register a new gesture in a system, the user needs to prepare a large amount of learning data in order to cause the system to learn the gesture to be registered. To cause the system to recognize a large number of gestures, a lot of labor and time is imposed on the user.

Therefore, it is desirable to make it possible to detect the motion of an object while being robust against partial hiding of an input image and without the necessity of a large amount of data for learning.

According to an embodiment of the present invention, there is provided an information processing apparatus that recognizes whether a registered action is included in an input moving image, the information processing apparatus including: storing means for storing information concerning model feature points, which are feature points at the time when a model moving image including models for recognizing an action is set as three dimensions including an image plane and time, and model feature quantities, which are feature quantities at the model feature points; first acquiring means for acquiring the input moving image; first feature-point extracting means for extracting, with the input moving image acquired by the first acquiring means set as three dimensions including an image plane and time, input feature points, which are feature points for recognizing the action, from the input moving image; first feature-quantity extracting means for extracting input feature quantities, which are feature quantities at the input feature points extracted by the first feature-point extracting means; feature-quantity comparing means for comparing the input feature quantities extracted by the first feature-quantity extracting means and the model feature quantities stored by the storing means and generating candidate corresponding feature point pairs as sets of feature points having similar feature quantities; posture estimating means for removing outliers from the candidate corresponding feature point pairs obtained as a result of the comparison by the feature-quantity comparing means, estimating postures of the models on the input moving image, and obtaining a recognition corresponding feature point pair group corresponding to the postures of the models; and recognition-result generating means for generating a recognition result on the basis of an estimation result of postures of the models obtained by the posture estimating means the recognition corresponding feature point pair group.

Preferably, the posture estimating means projects, onto a parameter space, an image transformation parameter for determining a positional posture in three dimensions including an image plane and time of the model moving image determined by N sets of the candidate corresponding feature point pairs selected at random, obtains a cluster having a largest number of members among clusters formed by performing clustering on the parameter space, and sets the candidate corresponding feature point pairs, which are members of the cluster having the largest number of members, as the recognition corresponding feature point pair group.

Preferably, the posture estimating means detects a centroid of the cluster having the largest number of members and estimates postures of the models using the centroid as a parameter corresponding to the postures.

Preferably, the posture estimating means performs clustering on the parameter space according to an NN method.

Preferably, the image transformation parameter is an affine parameter.

Preferably, the posture estimating means normalizes a range of the affine parameter and projects the normalized affine parameter onto the parameter space.

The posture estimating means normalizes the range of the affine parameter by setting a normalization coefficient of nine-dimensional parameters for determining rotation, expansion and reduction, and shearing deformation, respectively, to 1.0, setting a normalization coefficient of a parameter concerning translation in a horizontal direction among three-dimensional parameters for determining translation as an inverse number of the number of horizontal pixels of an assumed moving image, setting a normalization coefficient of a parameter concerning translation in a vertical direction as an inverse number of the number of vertical pixels of the assumed moving image, setting a normalization coefficient of a parameter concerning translation in a time direction as an inverse number of time length of the assumed moving image, and multiplying the affine parameter with these normalization coefficients.

Preferably, the posture estimating means executes clustering using a first threshold of a distance serving as a clustering reference for nine-dimensional parameters for determining rotation, expansion and reduction, and shearing deformation, respectively, and a second threshold of a distance serving as a clustering reference for three-dimensional parameters for determining translation, and the second threshold is larger than the first threshold.

Preferably, the first feature-point extracting means extracts, as the input feature points in the input moving image, a three-dimensional coordinate of an image plane and time that gives a maximum and a minimum of a Harris function H extended to the three dimensions including an image plane and time.

Preferably, the first feature-quantity extracting means extracts, for each of the three dimensions including an image plane and time, feature vectors including image information subjected to a partial differential Gaussian operation up to a fourth order as the input feature quantities.

Preferably, the feature-quantity comparing means generates the candidate corresponding feature point pairs using a norm of the input feature quantities and the model feature quantities as a scale of a non-similarity degree between the input feature quantities and the model feature quantities.

Preferably, the recognition-result generating means sets, as a recognition result of a model including the registered action, the models in which the numbers of elements of the recognition corresponding feature point pair group obtained by the posture estimating means are equal to or larger than a predetermined threshold.

Preferably, the recognition-result generating means sorts, in order from one with a largest number of elements, the models in which the numbers of elements of the recognition corresponding feature point pair group obtained by the posture estimating means are equal to or larger than a predetermined threshold, and sets all detected models and order of the models as a recognition result of a model including the registered action.

Preferably, the recognition-result generating means sets, as a reliability degree of the models in which the numbers of elements of the recognition corresponding feature point pair group are equal to or larger than a predetermined threshold, a ratio of the number of elements of the recognition corresponding feature point pair group of the respective models with respect to a sum of the numbers of the models in which the numbers of elements of the recognition corresponding feature quantity point pair group obtained by the posture estimating means are equal to or larger than the predetermined threshold.

Preferably, the recognition-result generating means sets, as a recognition result, an estimation result of postures of the models obtained by the posture estimating means.

Preferably, the recognition-result generating means sets, as a recognition result, a least square estimation result of the image transformation parameter of the models in which the numbers of elements of the recognition corresponding feature point pair group obtained by the posture estimating means are equal to or larger than a predetermined threshold.

Preferably, the information processing apparatus further includes dividing means for dividing the input moving image acquired by the first acquiring means into an area corresponding to the models and an area corresponding to a background, and the first feature-point extracting means extracts the input feature points from the area corresponding to the models in the input moving image divided by the dividing means.

Preferably, the information processing apparatus further includes: second acquiring means for acquiring the model moving image formed in the three dimensions including an image plane and time; second feature-point extracting means for extracting the model feature points, which are feature points for recognizing the action in the model moving image at the time when the model moving image is set as the three dimensions including an image plane and time; and second feature-quantity extracting means for extracting the model feature quantities, which are feature quantities at the model feature points extracted by the second feature-point extracting means.

Preferably, the information processing apparatus further includes dividing means for dividing the model moving image acquired by the second acquiring means into an area corresponding to the models and an area corresponding to a background, and the second feature-point extracting means extracts the model feature points from the area corresponding to the model in the model moving image divided by the dividing means.

Preferably, the dividing means applies morphological contraction processing to an area as a candidate of the area corresponding to the models after applying expansion processing thereto and determines the area corresponding to the models.

According to the embodiment of the present invention, there is provided an information processing method for an information processing apparatus including a storing unit that stores information concerning model feature points, which are feature points at the time when a model moving image including models for recognizing an action is set as three dimensions including an image plane and time, and model feature quantities, which are feature quantities at the model feature points, the information processing apparatus recognizing whether the registered action is included in an input moving image, the information processing method including the steps of: acquiring the input moving image; extracting, with the input moving image set as three dimensions including an image plane and time, input feature points, which are feature points for recognizing the action, from the input moving image; extracting input feature quantities, which are feature quantities at the input feature points; comparing the input feature quantities and the model feature quantities stored in the storing unit and generating candidate corresponding feature point pairs as sets of feature points having similar feature quantities; removing outliers from the candidate corresponding feature point pairs, estimating postures of the models on the input moving image, and obtaining a recognition corresponding feature point pair group corresponding to the postures of the models; and generating a recognition result on the basis of an estimation result of postures of the models and the recognition corresponding feature point pair group.

According to the embodiment of the present invention, there is provided a computer program for causing a computer to execute processing for recognizing whether the registered action is included in an input moving image using information concerning model feature points, which are feature points at the time when a model moving image including models for recognizing an action stored in a predetermined storing unit is set as three dimensions including an image plane and time, and model feature quantities, which are feature quantities at the model feature points, the computer program causing the computer to execute processing including the steps of: acquiring the input moving image; extracting, with the input moving image set as three dimensions including an image plane and time, input feature points, which are feature points for recognizing the action, from the input moving image; extracting input feature quantities, which are feature quantities at the input feature points; comparing the input feature quantities and the model feature quantities stored in the storing unit and generating candidate corresponding feature point pairs as sets of feature points having similar feature quantities; removing outliers from the candidate corresponding feature point pairs, estimating postures of the models on the input moving image, and obtaining a recognition corresponding feature point pair group corresponding to the postures of the models; and generating a recognition result on the basis of an estimation result of postures of the models and the recognition corresponding feature point pair group.

In the embodiment, an input moving image is acquired, with the input moving image set as three dimensions including an image plane and time, input feature points, which are feature points for recognizing the action, are acquired from the input moving image, input feature quantities, which are feature quantities at the input feature points, are extracted, the input feature quantities and a model feature quantities stored in advance are compared, candidate corresponding feature point pairs as sets of feature points having similar feature quantities are generated, outliers are removed from the candidate corresponding feature point pairs, postures of the models on the input moving image are estimated, a recognition corresponding feature point pair group corresponding to the postures of the models is obtained, and a recognition result is generated on the basis of an estimation result of postures of the models and the recognition corresponding feature point pair group.

According to another embodiment of the present invention, there is provided an information processing apparatus that generates, in performing processing for recognizing whether a predetermined action is included in an input moving image, information indicating features of the action used in the processing, the information processing apparatus including: acquiring means for acquiring a model moving image; feature-point extracting means for extracting model feature points, which are feature points for recognizing models for recognizing the action in the model moving image at the time when the model moving image is set as three dimensions including an image plane and time; and feature-quantity extracting means for extracting model feature quantities, which are feature quantities at the model feature points extracted by the feature-point extracting means.

Preferably, the feature-point extracting means extracts, as the model feature point in the input moving image, a three-dimensional coordinate that gives a maximum and a minimum of a Harris function H extended to the three dimensions including an image plane and time.

Preferably, the feature-quantity extracting means extracts, for each of the three dimensions including an image plane and time, feature vectors including image information subjected to a partial differential Gaussian operation up to a fourth order as the model feature quantities.

Preferably, the information processing apparatus further includes dividing means for dividing the model moving image acquired by the acquiring means into an area corresponding to the models and an area corresponding to a background, and the feature-point extracting means extracts the model feature points from the area corresponding to the models in the model moving image divided by the dividing means.

Preferably, the dividing means applies morphological contraction processing to an area as a candidate of the area corresponding to the models after applying expansion processing thereto and determines the area corresponding to the models.

According to the other embodiment of the present invention, there is provided an information processing method for an information processing apparatus that generates, in performing processing for recognizing whether a predetermined action is included in an input moving image, information indicating features of the action used in the processing, the information processing method including the steps of: acquiring a model moving image; extracting model feature points, which are feature points for recognizing models for recognizing the action in the model moving image at the time when the model moving image is set as three dimensions including an image plane and time; and extracting model feature quantities, which are feature quantities at the model feature points.

According to the other embodiment of the present invention, there is provided a computer program for causing a computer to execute processing for generating, in performing processing for recognizing whether a predetermined action is included in an input moving image, information indicating features of the action used in the processing, the computer program causing the computer to execute processing including the steps of: acquiring a model moving image; extracting model feature points, which are feature points for recognizing models for recognizing the action in the model moving image at the time when the model moving image is set as three dimensions including an image plane and time; and extracting model feature quantities, which are feature quantities at the model feature points.

In the other embodiment of the present invention, a model moving image is acquired, model feature points, which are feature points for recognizing models for recognizing the action in the model moving image at the time when the model moving image is set as three dimensions including an image plane and time, are extracted; and model feature quantities, which are feature quantities at the model feature points, are extracted.

A network means a mechanism in which at least two apparatuses are connected and information can be transmitted from a certain apparatus to the other apparatuses. The apparatuses that communicate via the network may be apparatuses independent from one another or may be internal blocks configuring one apparatus.

The communication may be not only wireless communication and wire communication but also communication in which the wireless communication and the wire communication are mixed, i.e., communication in which the wireless communication is performed in a certain section and the wire communication is performed in other sections. Further, communication from the certain apparatus to the other apparatuses may be performed by the wire communication and communication from the other apparatuses to the certain apparatus may be performed by the wireless communication.

The recognition processing apparatus may be an independent apparatus or may be a block that performs the recognition processing for the information processing apparatus.

As described above, according to the embodiment of the present invention, it is possible to perform the recognition processing. In particular, it is possible to detect, while being robust against partial hiding of an input image and without the necessity of a large amount of data for learning, the motion of an object by performing processing using three dimensions including an image plane and time.

According to the other embodiment of the present invention, it is possible to extract feature points and feature quantities of a model for the recognition processing. In particular, it is possible to extract feature points and feature quantities in three dimensions including an image plane and time.

BRIEF DESCRIPTION OF THE DRAWINGS

FIG. 4 is a diagram for explaining separation of a background;

FIG. 5 is a diagram for explaining separation of a background;

DESCRIPTION OF THE PREFERRED EMBODIMENTS

Figure 1:
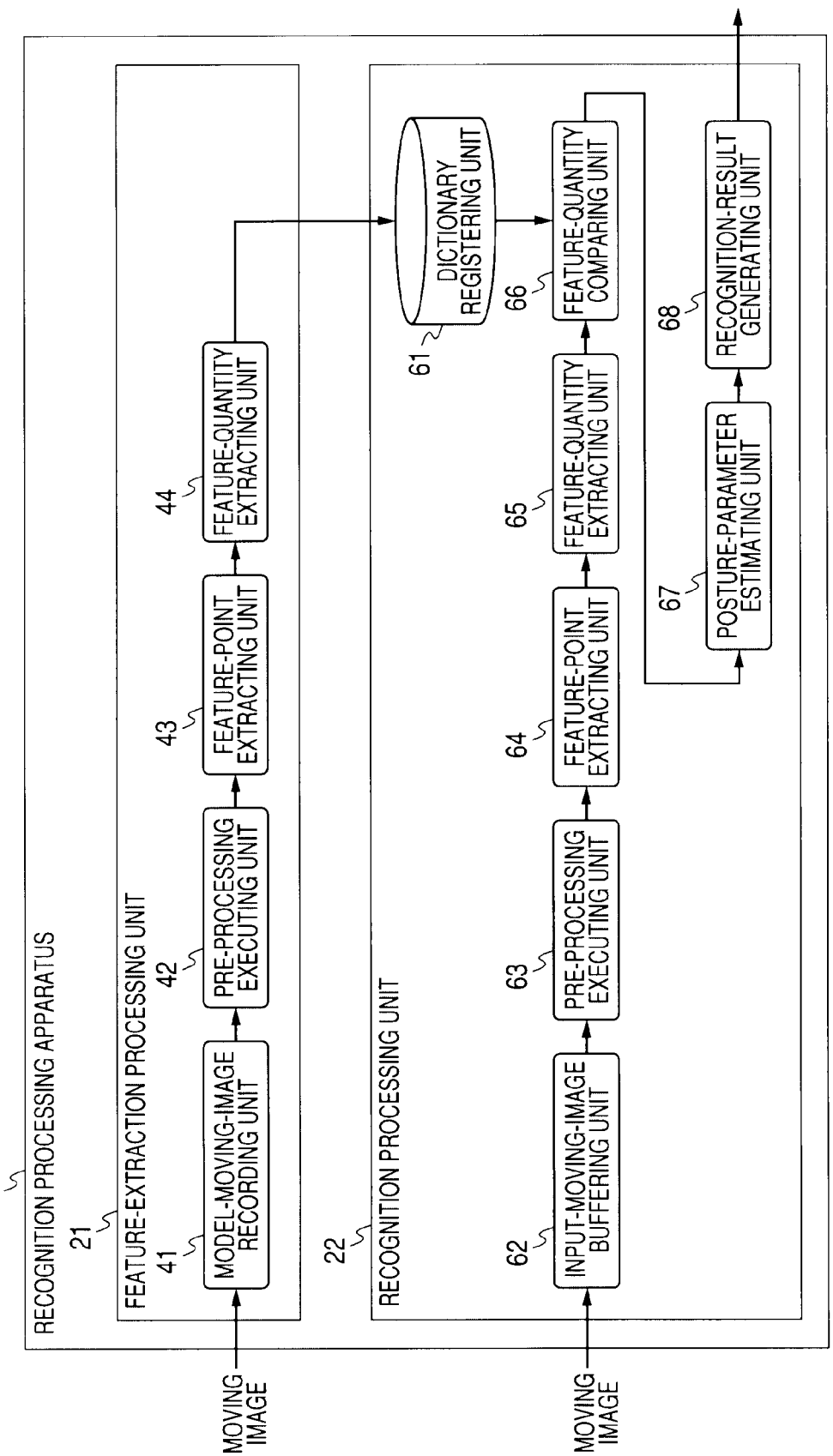
FIG. 1 is a block diagram of a configuration of a recognition processing apparatus.

Embodiments of the present invention will be hereinafter explained. A correspondence relation between elements of the present invention and the embodiments described or shown in the specification or the drawings is described as follows. This description is a description for confirming that the embodiments supporting the present invention are described or shown in the specification or the drawings. Therefore, even if there is an embodiment that is described or shown in the specification or the drawings but is not described herein as an embodiment corresponding to an element of the present invention, this does not means that the embodiment does not correspond to the element. Conversely, even if an embodiment is described herein as an embodiment corresponding to an element of the present invention, this does not means that the embodiment does not correspond to elements other than the element.

According to an embodiment of the present invention, there is provided an information processing apparatus (e.g., a recognition processing apparatus 11 shown in FIG. 1, an apparatus having a function of a recognition processing unit 22 shown in FIG. 1, or a personal computer 500 shown in FIG. 10) that recognizes whether a registered action is included in an input moving image, the information processing apparatus including: storing means (e.g., a dictionary registering unit 61 shown in FIG. 1) for storing information concerning model feature points, which are feature points at the time when a model moving image including models for recognizing an action is set as three dimensions including an image plane and time, and model feature quantities, which are feature quantities at the model feature points; first acquiring means (e.g., an input-moving-image buffering unit 62 shown in FIG. 1) for acquiring the input moving image; first feature-point extracting means (e.g., a feature-point extracting unit 64 shown in FIG. 1) for extracting, with the input moving image acquired by the first acquiring means set as three dimensions including an image plane and time, input feature points, which are feature points for recognizing the action from the input moving image; first feature-quantity extracting means (e.g., a feature-quantity extracting unit 65 shown in FIG. 1) for extracting input feature quantities, which are feature quantities at the input feature points extracted by the first feature-point extracting means; feature-quantity comparing means (e.g., a feature-quantity comparing unit 66 shown in FIG. 1) for comparing the input feature quantities extracted by the first feature-quantity extracting means and the model feature quantities stored by the storing means and generating candidate corresponding feature point pairs as sets of feature points having similar feature quantities; posture estimating means (e.g., a posture-parameter estimating unit 67 shown in FIG. 1) for removing outliers from the candidate corresponding feature point pairs obtained as a result of the comparison by the feature-quantity comparing means, estimating postures of the models on the input moving image, and obtaining a recognition corresponding feature point pair group corresponding to the postures of the models; and recognition-result generating means (e.g., a recognition-result generating unit 68 shown in FIG. 1) for generating a recognition result on the basis of the recognition corresponding feature point pair group.

Preferably, the information processing apparatus further includes dividing means (e.g., a pre-processing executing unit 63 shown in FIG. 1) for dividing the input moving image acquired by the first acquiring means into an area corresponding to the models and an area corresponding to a background, and the first feature-point extracting means extracts the input feature points from the area corresponding to the models in the input moving image divided by the dividing means.

Preferably, the information processing apparatus further includes: second acquiring means (e.g., a model-moving-image recording unit 41 shown in FIG. 1) for acquiring the model moving image formed in the three dimensions including an image plane and time; second feature-point extracting means (e.g., a feature-point extracting unit 43 shown in FIG. 1) for extracting the model feature points, which are feature points for recognizing the action in the model moving image at the time when the model moving image is set as the three dimensions including an image plane and time; and second feature-quantity extracting means (a feature-quantity extracting unit 44 shown in FIG. 1) for extracting the model feature quantities, which are feature quantities at the model feature points extracted by the second feature-point extracting means.

Preferably, the information processing apparatus further includes dividing means (e.g., a pre-processing executing unit 42 shown in FIG. 1) for dividing the model moving image acquired by the second acquiring means into an area corresponding to the models and an area corresponding to a background, and the second feature-point extracting means extracts the model feature points from the area corresponding to the model in the model moving image divided by the dividing means.

Figure 7:
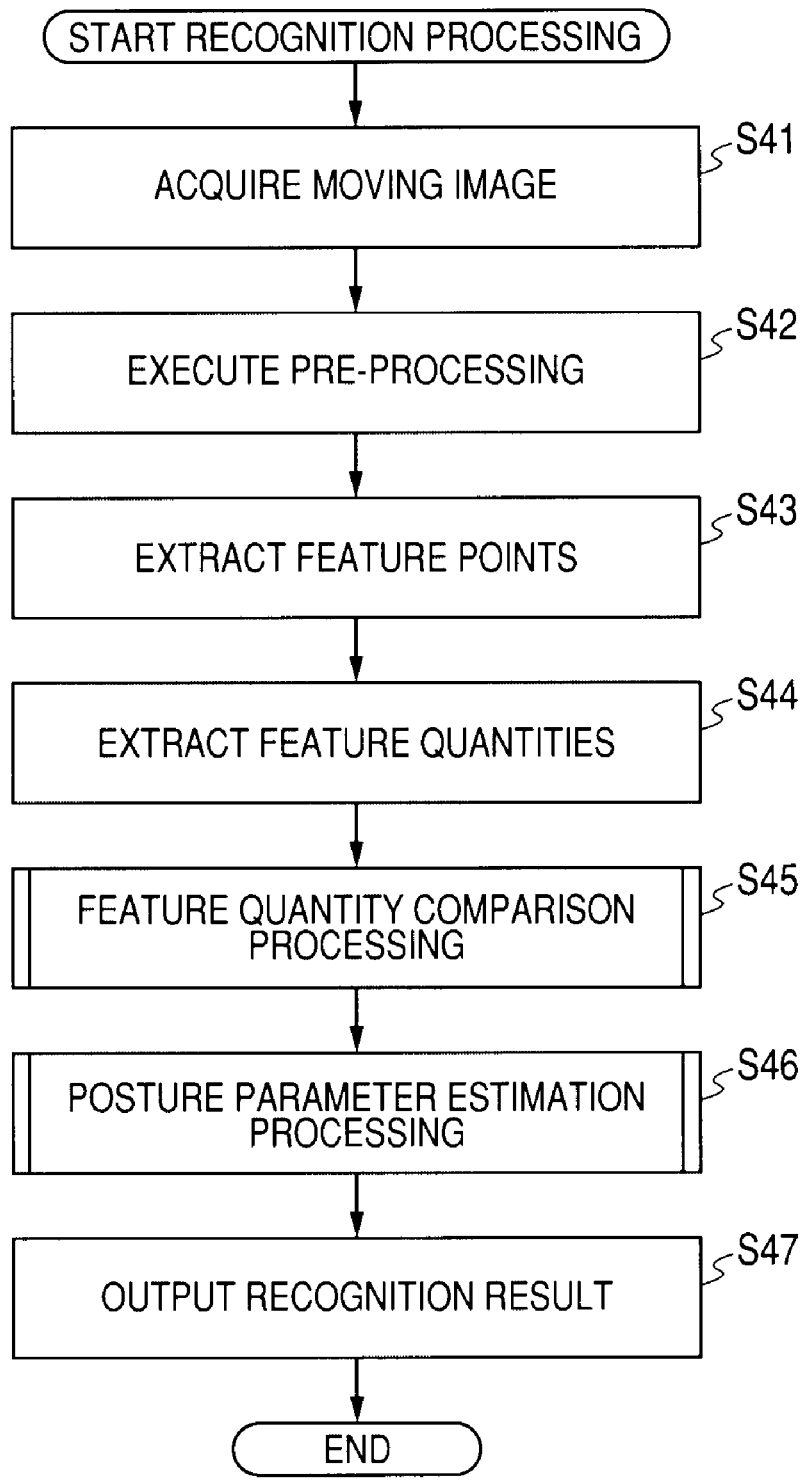
FIG. 7 is a flowchart for explaining recognition processing.

According to the embodiment of the present invention, there is provided an information processing method for an information processing apparatus (e.g., a recognition processing apparatus 11 shown in FIG. 1, an apparatus having a function of a recognition processing unit 22 shown in FIG. 1, or a personal computer 500 shown in FIG. 10) including a storing unit that stores information concerning model feature points, which are feature points at the time when a model moving image including models for recognizing an action is set as three dimensions including an image plane and time, and model feature quantities, which are feature quantities at the model feature points, the information processing apparatus recognizing whether the registered action is included in an input moving image, the information processing method including the steps of: acquiring the input moving image (e.g., processing in step S41 shown in FIG. 7); extracting, with the input moving image set as three dimensions including an image plane and time, input feature points, which are feature points for recognizing the action from the input moving image (e.g., processing in step S43 shown in FIG. 7); extracting input feature quantities, which are feature quantities at the input feature points (e.g., processing in step S44 shown in FIG. 7); comparing the input feature quantities and the model feature quantities stored in the storing unit and generating candidate corresponding feature point pairs as sets of feature points having similar feature quantities (e.g., processing in step S45 shown in FIG. 7); removing outliers from the candidate corresponding feature point pairs, estimating postures of the models on the input moving image, and obtaining a recognition corresponding feature point pair group corresponding to the postures of the models (e.g., processing in step S46 shown in FIG. 7); and generating a recognition result on the basis of the recognition corresponding feature point pair group (e.g., processing in step S47 shown in FIG. 7).

According to the embodiment of the present invention, there is provided a computer program for causing a computer to execute processing for recognizing, using information concerning model feature points, which are feature points at the time when a model moving image including models for recognizing an action stored in a predetermined storing unit is set as three dimensions including an image plane and time, and model feature quantities, which are feature quantities at the model feature points, whether the registered action is included in an input moving image, the computer program causing the computer to execute processing including the steps of: acquiring the input moving image (e.g., processing in step S41 shown in FIG. 7); extracting, with the input moving image set as three dimensions including an image plane and time, input feature points, which are feature points for recognizing the action from the input moving image (e.g., processing in step S43 shown in FIG. 7); extracting an input feature quantity as a feature quantity at the input feature point (e.g., processing in step S44 shown in FIG. 7); comparing the input feature quantities and the model feature quantities stored in the storing unit and generating candidate corresponding feature point pairs as sets of feature points having similar feature quantities (e.g., processing in step S45 shown in FIG. 7); removing outliers from the candidate corresponding feature point pairs, estimating postures of the models on the input moving image, and obtaining a recognition corresponding feature point pair group corresponding to the postures of the models (e.g., processing in step S46 shown in FIG. 7); and generating a recognition result on the basis of the recognition corresponding feature point pair group (e.g., processing in step S47 shown in FIG. 7).

According to another embodiment of the present invention, there is provided an information processing apparatus that generates, in performing processing for recognizing whether a predetermined action is included in an input moving image, information indicating features of the action used in the processing, the information processing apparatus including: acquiring means (e.g., a model-moving-image recording unit 41 shown in FIG. 1) for acquiring a model moving image; feature-point extracting means (e.g., a feature-point extracting unit 43 shown in FIG. 1) for extracting model feature points, which are feature points for recognizing models for recognizing the action in the model moving image at the time when the model moving image is set as three dimensions including an image plane and time; and feature-quantity extracting means (e.g., a feature-quantity extracting unit 44 shown in FIG. 1) for extracting model feature quantities, which are feature quantities at the model feature points extracted by the feature-point extracting means.

Preferably, the information processing apparatus further includes dividing means (e.g., a pre-processing executing unit 42 shown in FIG. 1) for dividing the model moving image acquired by the acquiring means into an area corresponding to the models and an area corresponding to a background, and the feature-point extracting means extracts the model feature points from the area corresponding to the models in the model moving image divided by the dividing means.

Figure 6:
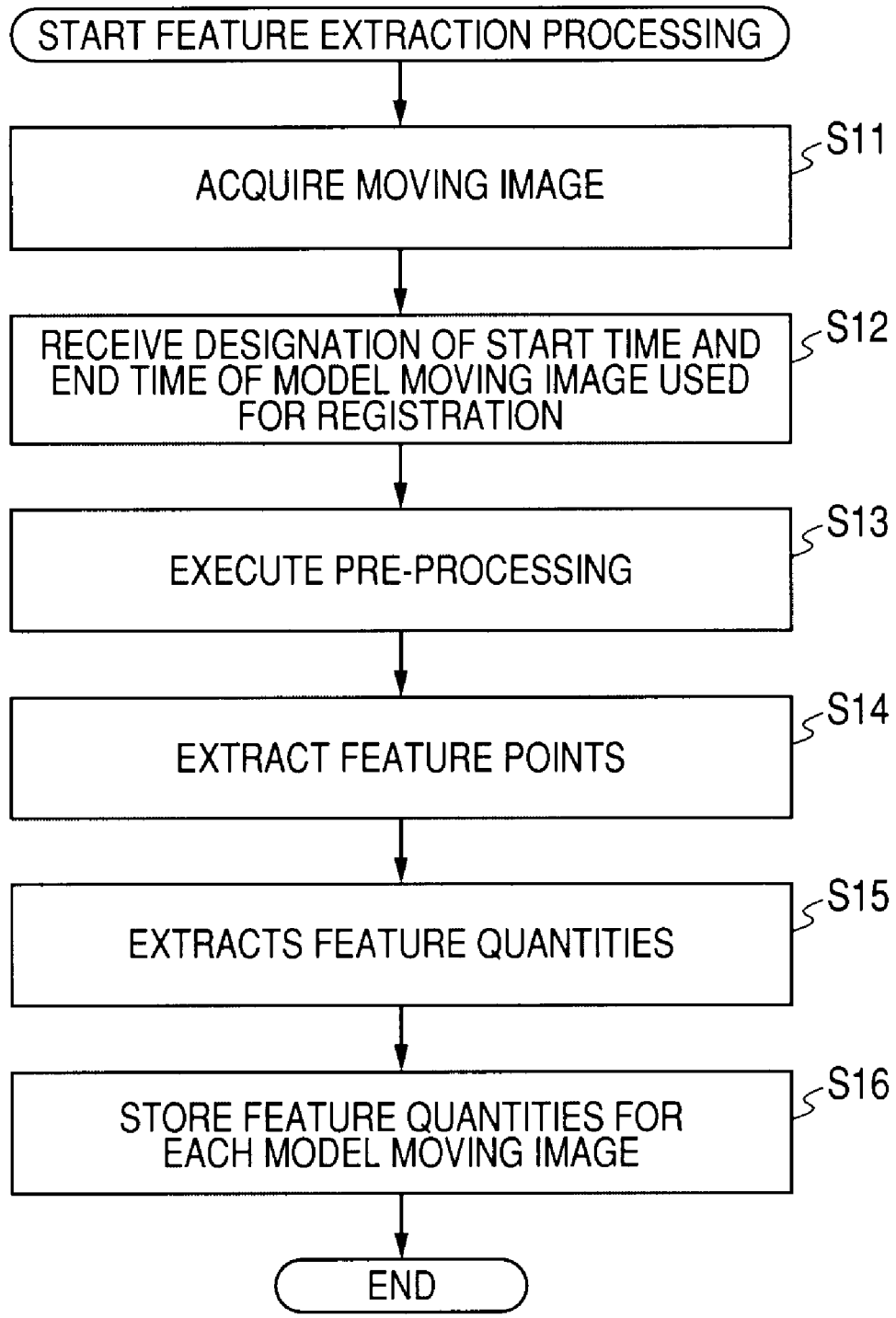
FIG. 6 is a flowchart for explaining feature extraction processing.

According to the other embodiment of the present invention, there is provided an information processing method for an information processing apparatus that generates, in performing processing for recognizing whether a predetermined action is included in an input moving image, information indicating features of the action used in the processing, the information processing method including the steps of: acquiring a model moving image (e.g., processing in step S11 shown in FIG. 6); extracting model feature points, which are feature points for recognizing models for recognizing the action in the model moving image at the time when the model moving image is set as three dimensions including an image plane and time (e.g., processing in step S14 shown in FIG. 6); and extracting model feature quantities, which are feature quantities at the model feature points (e.g., processing in step S15 shown in FIG. 6).

According to the other embodiment of the present invention, there is provided a computer program for causing a computer to execute processing for generating, in performing processing for recognizing whether a predetermined action is included in an input moving image, information indicating features of the action used in the processing, the computer program causing the computer to execute processing including the steps of: acquiring a model moving image (e.g., processing in step S11 shown in FIG. 6); extracting model feature points, which are feature points for recognizing models for recognizing the action in the model moving image at the time when the model moving image is set as three dimensions including an image plane and time (e.g., processing in step S14 shown in FIG. 6); and extracting model feature quantities, which are feature quantities at the model feature point (e.g., processing in step S15 shown in FIG. 6).

Exemplary embodiments of the present invention are explained below with reference to the accompanying drawings.

A configuration of a recognition processing apparatus 11 according to an embodiment of the present invention is shown in FIG. 1.

The recognition processing apparatus 11 includes a feature-extraction processing unit 21 that registers a model action and a recognition processing unit 22 that executes recognition processing. The recognition processing apparatus 11 detects, from an input image sequence, a time-space pattern similar to time-space patterns of an action, a gesture, an event, and the like in an image sequence registered by a user and, when the similar time-space pattern is detected, outputs corresponding point information, corresponding time, a corresponding place, and a corresponding posture, parameters thereof, similarity degrees thereof, or the like.

In the following description, the time-space patterns of the action, the gesture, the event, and the like in the image sequence are collectively referred to as action. The image sequence is referred to as a moving image as well.

In this explanation, it is assumed that there is one apparatus as the recognition processing apparatus 11. However, it goes without saying that each of the feature-extraction processing unit 21 and the recognition processing unit 22 may be configured as one apparatus.

First, respective units of the feature-extraction processing unit 21 are explained.

The feature-extraction processing unit 21 includes a model-moving-image recording unit 41, a pre-processing executing unit 42, a feature-point extracting unit 43, and a feature-quantity extracting unit 44.

The model-moving-image recording unit 41 acquires moving image data for acquiring feature quantities as models of recognition processing and records the moving image data together with time information. The moving image data to be recorded is a model image sequence (hereinafter also referred to as model moving image) including an action desired to be recognized by a system (hereinafter referred to as model action).

The model-moving-image recording unit 41 may incorporate a camera, which can pick up a moving image, and acquire moving image data according to an instruction of the user using a user interface such as a recording start and end button. Alternatively, the model-moving-image recording unit 41 may acquire moving image data used as the model moving image from an external apparatus via wire or wirelessly. The model-moving-image recording unit 41 sets, for example, on the basis of an operation input of the user inputted by a not-shown operation input unit, start time and end time of a portion used as a model in the acquired moving image data, records the moving image data of that portion as a model moving image, and supplies the moving image data to the pre-processing executing unit 42.

Figure 2:
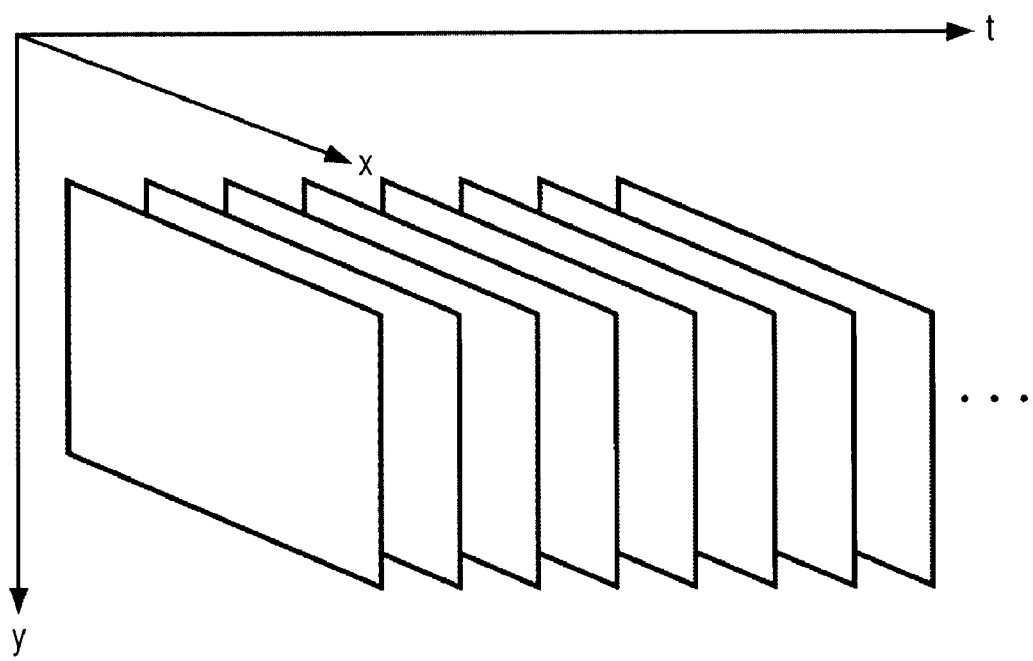
FIG. 2 is a diagram for explaining a three-dimensional image sequence with time "t" set as a dimension in a spatial depth direction with respect to an image plane x-y.

The recognition processing apparatus 11 treats an image sequence as a three-dimensional image, for example, as shown in FIG. 2, assuming that time "t" is a dimension in a spatial depth direction with respect to an image plane x-y. In other words, since the image sequence can be grasped as a three-dimensional coordinate system formed by time (a time stamp "t") and a plane (an x-y plane of a image at "t" time), a representation I(x,y,t) is used as a mathematical representation of the image sequence. Therefore, in the following explanation, an i-th model moving image among plural model moving images is represented as $I_{MODEL}^{[i]}(x,y,t)$.

The pre-processing executing unit 42 separates an action portion and a background portion in a model moving image. Specifically, for example, the pre-processing executing unit 42 can separate an action portion and a background portion from the model moving image $I_{MODEL}^{[i]}(x,y,t)$ and generates a mask moving image in which a pixel value of pixels in the action portion is 1 and a pixel value of pixels in the background portion is 0. A method of separating the action portion and the background portion may be an arbitrary method.

The pre-processing executing unit 42 may allow the user to directly select areas of actions in respective frames of the model moving image using, for example, an input interface such as a mouse pointer device or a touch pad of a not-shown operation input unit. The pre-processing executing unit 42 may make it possible to acquire binary image sequence in which a pixel value of action pixels is 1 and a pixel value of pixels of a non-selected area, i.e., a background area is 0.

Figure 3:
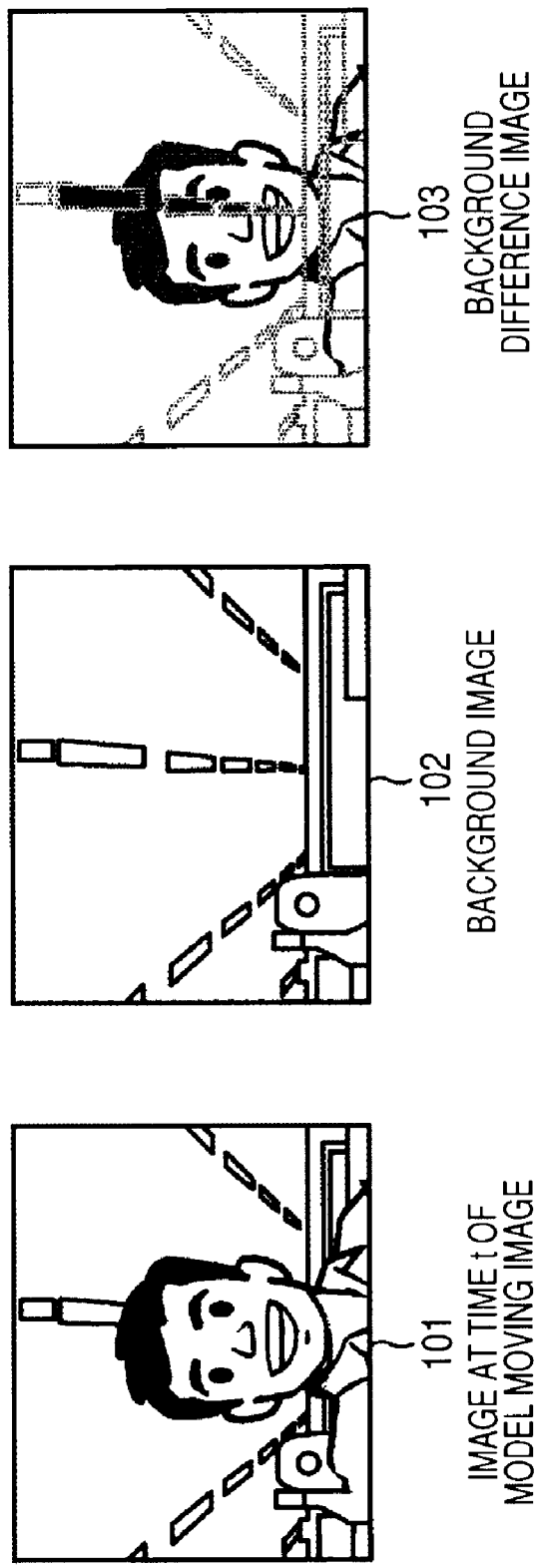
FIG. 3 is a diagram for explaining separation of a background.

The pre-processing executing unit 42 may make it possible to acquire, for example, a background image 102 corresponding to an image 101 at time "t" of a model moving image shown in FIG. 3, i.e., an image in which an action is not picked up and only the environment, i.e., a background is picked up in a setting place of a camera or the like for picking up the model moving image, calculate a background difference image 103 obtained by subtracting the background image from images at time "t" of the moving image, binarize a sequence of this background difference image using a predetermined threshold, and obtain a binary image sequence.

As shown in FIG. 4, it is highly likely that, in an image 111 after only the binary processing is performed by using the threshold, for example, as indicated by a black portion on an inner side of a white portion in the figure, a noise portion is left and an area judged as a background portion is generated in a range that should be an action portion. In such a case, for example, morphological expansion processing (e.g., 8-neighbor expansion processing) is suitably performed.

The 8-neighbor expansion processing is processing for expanding, a portion with a pixel value 1, i.e., an action portion when at least one pixel judged as an action portion, i.e., a pixel with a pixel value 1 is present in eight pixels $P_1$ to $P_8$ near a certain pixel $P_0$ on a binary image as a pixel of attention, by performing processing for transforming a pixel value of the pixel of attention $P_0$ into 1, i.e., transforming the pixel of attention into the action portion. This processing is represented by the following formula (1):

$$f(P_0)=f(P_1)\cup f(P_2)\cup \ldots \cup f(P_8) \quad (1)$$

where, $\cup$ indicates a logical sum (OR) and f(Px) indicates a pixel value in a pixel Px.

To increase a degree of expansion in this processing, i.e., a degree for expanding an outer periphery of a recognition area as the action portion, the processing described above may be repeated plural times. Alternatively, when a pixel judged as at least one action portion, i.e., a pixel with a pixel value 1 is present among near pixels in a range wider than near eight pixels of the pixel of attention, the pixel value of the pixel of attention may be changed to 1, i.e., the pixel of attention may be changed to an action portion.

The binary image obtained by the selection of the user or obtained by the background difference image 103 as described above or a binary image obtained by applying the 8-neighbor expansion processing to the binary image when necessary is referred to as mask image 1 and represented as image $I_{MASK1}^{[i]}(x,y,t)$.

As shown in FIG. 5, the pre-processing executing unit 42 can obtain, by multiplying the model moving image and the mask moving image 1 together using the image $I_{MASK1}^{[i]}(x,y,t)$ corresponding to the mask image 1, i.e., an image 121 after median filtering, a model moving image in which a background is masked out, a pixel value of pixels of the background is 0, and a pixel value of the other portions is an original pixel value, i.e., a model moving image subjected to the background separation processing. A masked image obtained at this point is, for example, an image 122 at time "t" of the model moving image after the background separation processing also shown in FIG. 5.

When it is unnecessary to specifically distinguish the model moving image subjected to the background separation processing, the model moving image is also represented as $I_{MODEL}^{[i]}(x,y,t)$.

In particular, when expansion processing for an area corresponding to the action portion such as the 8-neighbor expansion processing is applied, the image 122 at time "t" of the model moving image after the background separation processing is likely to include a portion that should originally be separated as a background around an actual action portion (a face portion of a person). When feature-point extraction processing and feature-quantity extraction processing described later are performed by using the image 122 at time "t" of the model moving image after the background separation processing, it is likely that feature points and feature quantities of a portion corresponding to the background are extracted.

Therefore, the pre-processing executing unit 42 may apply morphological contraction processing (e.g., 8-neighbor contraction processing) to respective frames of the binary image sequence obtained as described above. It is likely that feature points to be obtained decrease when feature points are extracted by using an image masked by using a mask image subjected to the morphological contraction processing. However, since it is possible to eliminate, as much as possible, the likelihood that feature points and feature quantities of the portion corresponding to the background are extracted, accuracy of recognition is improved.

The 8-neighbor contraction processing is explained below as a specific example of the morphological contraction processing.

The 8-neighbor contraction processing is processing for changing, with a certain pixel $P_0$ on a binary image set as a pixel of attention, when at least one background pixel, i.e., a pixel with a pixel value 0 is present in near eight pixels $P_1$ to $P_8$ close to the pixel of attention $P_0$, a pixel value of $P_0$ to a background pixel value, i.e., 0. This processing is represented by the following formula (2):

$$f(P_0)=f(P_1)\cap f(P_2)\cap \ldots \cap f(P_8) \quad (2)$$

where $\cap$ indicates a logical product (AND) and f(Px) indicates a pixel value in a pixel Px.

To increase a degree of contraction in this processing, i.e., a degree for narrowing an outer periphery of a recognition area as the action portion, the processing described above may be repeated plural times. Alternatively, when a pixel judged as at least one background portion (a pixel with a pixel value 0) is present among near pixels in a range wider than near eight pixels of the pixel of attention, the pixel value of the pixel of attention may be changed to 0, i.e., the pixel of attention may be changed to an background portion.

The pre-processing executing unit 42 applies the morphological contraction processing (e.g., the 8-neighbor contraction processing) to the mask image 1 ($I_{MASK1}^{[i]}(x,y,t)$) and generates a mask image 2 (represented as $I_{MASK2}^{[i]}(x,y,t)$).

The pre-processing executing unit 42 applies seemingly contrary kinds of processing, i.e., expansion processing for the area corresponding to the action portion such as the 8-neighbor expansion processing and the morphological contraction processing (e.g., the 8-neighbor contraction processing) to an image. This is extremely useful processing for limitlessly eliminating, for example, in the image 111 after the threshold processing explained with reference to FIG. 4, the likelihood that feature points and feature quantities of the portion corresponding to the background are extracted while eliminating a noise portion caused as indicated by a black portion on an inner side of a white portion in the figure. For example, when the morphological contraction processing is directly applied to the image 111 after the threshold processing explained with reference to FIG. 4, it is difficult to eliminate noise caused as indicated by the black portion on the inner side of the white portion in FIG. 4. As a result, misdetection is caused. On the other hand, when the morphological contraction processing is applied after noise caused in the black portion on the inner side of the white portion is eliminated, i.e., all quantities of the black portion on the inner side of the white portion are changed to 1 (the black portion is changed to the white portion) as in the image 112 after morphological expansion shown in FIG. 4, the noise portion is not caused again by contraction.

When the pre-processing executing unit 42 is not provided and the pre-processing is not executed, this does not mean that it is difficult to execute processing described later and perform processing for extracting feature points and feature quantities of a model moving image. In other words, when the pre-processing executing unit 42 is not provided and the pre-processing is not executed, the processing for extracting feature points and feature quantities of the model moving image is applied to the background portion. Therefore, it is likely that processing time increases and recognition accuracy of recognition processing performed by using the feature points and the feature quantities falls. However, it is possible to apply the processing for extracting feature points and feature quantities of the model moving image to the moving image including the background portion.

Referring back to FIG. 1, the explanation of the respective units of the recognition processing apparatus 11 is continued.

The feature-point extracting unit 43 extracts feature points from the model moving image. The feature-point extracting unit 43 may extract feature points using any one of various methods already publicly known. However, a feature-point extracting method robust against deformation of a time-space, i.e., three-dimensions with time "t" set as a dimension in a spatial depth direction with respect to the image plane x-y explained with reference to FIG. 2 is suitably used because accuracy of recognition is improved.

As a specific example of a method used for feature point extraction performed by the feature-point extracting unit 43, a feature-point extracting method employing a technique described in "I. Laptev, "On Space-Time Interest Points", in International Journal of Computer Vision, vol 64, number 2/3, 2005" is explained. Feature points extracted by this feature-point extracting method are referred to as ST (Spatio-Temporal) feature points or simply as feature points.

The ST feature points are feature points detected on the basis of a generalized Harris scale extended in a time-space, i.e., three dimensions with time "t" set as a dimension in a spatial depth direction with respect to the image plane x-y explained with reference to FIG. 2. The ST feature points are defined as a three-dimensional coordinate (x,y,t) that gives a maximum and a minimum of a three-dimensional extended Harris function H indicated by the following formula (3).

$$H = \det(\mu) - k \cdot \text{trace}^3(\mu) \tag{3}$$

det(μ) in Formula (3) indicates a determinant of a square matrix, trace³(μ) indicates a cube of a sum of diagonal components of a matrix, and k is a constant.

μ in Formula (3) is given by the following formula (4).

$$\mu(x,y,t;\sigma^2,\tau^2) = G(x,y,t;\sigma^2,\tau^2) * (\nabla L(\nabla L)^T) \tag{4}$$

G(x,y,t;σ²,τ²) in Formula (4) is a three-dimensional Gaussian filter and given by the following formula (5):

$$G(x,y,t;\sigma^2,\tau^2) = (1/\text{sqrt}((2\pi)^3 \sigma^4 \tau^2)) \exp(-(x^2+y^2)/2\sigma^2 - t^2/2\tau^2) \tag{5}$$

In Formula (4) and Formula (5), σ is a parameter for determining a Gaussian shape (the spread of the foot) in a space domain and τ is a parameter for determining a Gaussian shape in a time domain. In other words, σ is a parameter corresponding to a blur degree of a value by a low-pass filter in the space domain and τ is a parameter corresponding to a blur degree of a value by the low-pass filter in the time domain. Optimum quantities are suitably used as σ and τ according to the resolution of a camera device that acquires an image. σ and τ can be set to, for example, quantities of about σ=8 and τ=4.

* in Formula (4) indicates an inner product. The right side of Formula (4) is an operation for blurring $(\nabla L(\nabla L)^T)$ with a three-dimensional Gaussian filter G. ∇L in Formula (4) is represented by the following formula (6).

$$L = (L_x(x,y,t;\sigma L^2,\tau L^2), L_y(x,y,t;\sigma L^2,\tau L^2), L_t(x,y,t;\sigma L^2, \tau L^2))^T \tag{6}$$

In Formula (6), the following formulas (7) to (9) hold.

$$L_x(x,y,t;\sigma_L^2,\tau_L^2) = \alpha_x(G(x,y,t;\sigma_L^2,\tau_L^2) * I(x,y,t)) \tag{7}$$

$$L_y(x,y,t;\sigma_L^2,\tau_L^{L2}) = \alpha_y(G(x,y,t;\sigma_L^2,\tau_L^2) * I(x,y,t)) \tag{8}$$

$$L_t(x,y,t;\sigma_L^2,\tau_L^2) = \alpha_t(G(x,y,t;\sigma_L^2,\tau_L^2) * I(x,y,t)) \tag{9}$$

∇L in Formula (6) represents a time-space image gradient and μ in Formula (4) represents a secondary moment matrix of the time-space image gradient.

The parameter $\sigma_L$ is a space scale parameter and the parameter $\tau_L$ is a time scale parameter. These parameters are parameters for determining sizes in time and space (an x-y plane of an image) directions that should be taken into account when feature points are extracted. $\sigma_L$ and $\tau_L$ are determined independently from each other. ST feature points can be detected in nine combinations in total, for example, $\sigma_L = \{2,4,8\}$ and $\tau_L = \{2,4,8\}$. By setting $\sigma_L$ and $\tau_L$ as, for example, $\sigma_L = \{2,4,8\}$ and $\tau_L = \{2,4,8\}$, it is possible to have latitude in scales in terms of a space in the x-y plane and pick up feature points from a wide range.

The feature-point extracting unit 43 calculates Formula (3) using the supplied model moving image $I_{MODEL}^{[i]}(x,y,t)$, detects a coordinate (x,y,t) that gives a maximum and a minimum of the formula, and sets the coordinate (x,y,t) as an ST feature point.

At this point, the feature-point extracting unit 43 applies processing for extracting ST feature points to a moving image, a background of which is masked in pre-processing. In the extraction processing, the feature-point extracting unit 43 may use the mask moving image 1. However, in particular, when a moving image masked by using the mask moving image 2 is used or when only a feature point, a value of which in the mask moving image 2 in the feature point position (x,y,t) is 1, among the extracted ST feature points is suitably set as an effective feature point for describing a model action because, as described above, it is possible to substantially eliminate the likelihood that feature points are extracted from the background portion.

In an acquired model moving image, a background is discontinuously hidden by a moving human body or object. Since image information of this portion excessively changes, it is highly likely that the ST feature points are detected. A feature amount calculated for a certain feature point is calculated from image information of an area near the feature point. Therefore, when the feature point is a point near a background area, the feature point includes information on the background portion. Even corresponding feature points having the same three-dimensional coordinate position of an image plane x-y and time "t" in an input moving image and an action portion, since backgrounds are slightly different, feature quantities are not matched. In other words, such a feature point is a feature point not robust against a view point change and a background change.

Therefore, recognition performance is improved by providing processing for removing, with mask processing performed by using the mask moving image 2, the feature point not robust against a view point change and a background change detected near a boundary between the background portion and the action portion.

N ST feature points of the model moving image $I_{MODEL}^{[i]}(x,y,t)$ obtained by the feature-point extracting unit 43 according to the processing are represented as $P_{MODEL}^{[i]} = \{P_1^{[i]}, P_2^{[i]}, \ldots, P_N^{[i]}\}$. The feature-point extracting unit 43 supplies the N ST feature points $P_{MODEL}^{[i]} = \{P_1^{[i]}, P_2^{[i]}, \ldots, P_N^{[i]}\}$ to the feature-quantity extracting unit 44.

The feature-quantity extracting unit 44 extracts feature quantities at feature points of the model moving image $I_{MODEL}^{[i]}(x,y,t)$ extracted and supplied by the feature-point extracting unit 43. In general, several feature quantities used in action event recognition are proposed in, for example, I. Laptev and T. Lindeberg, "Local Descriptors for Spatio-Temporal Recognition", in ECCV Workshop "Spatial Coherence for Visual Motion Analysis", Springer LNCS Vol. 3667, pp. 91 to 103, 2004". Various methods can be applied to the feature quantity extraction processing of the feature-quantity extracting unit 44. As an example of the methods, extraction of feature quantities employing a technique described in "I. Laptev, "On Space-Time Interest Points", in International Journal of Computer Vision, vol 64, number 2/3, 2005" is explained below.

A time-space feature quantity $V_P$ at a certain ST feature point $P = (x_P, y_P, t_P)$ among ST feature points extracted by the feature-point extracting unit 43 is defined by the following formula (10).

$$V_P = \{\sigma_P L_x, \sigma_P L_y, \tau_P L_t, \sigma_P^2 L_{xx}, \ldots, \sigma_P \tau_P^3 L_{yttt}, \tau_P^4 L_{tttt}\} \tag{10}$$

L affixed with x, y, or t corresponds to the following formula (11). Parameters $\sigma_P$ and $\tau_P$ are scale parameters of detected P.

$$L_x^m {}_y^n {}_t^k(x_P, y_P, t_P; \sigma_P^2 \tau_P^2) = \alpha_x^m {}_y^n {}_t^k(G(x_P, y_P, t_P; \sigma_P^2, \tau_P^2) * I(x_P, y_P, t_P)) \tag{11}$$

In Formula (11), m is an order of x in Formula (10), n is an order of y in Formula (10), and k is an order of t in Formula (10).

The time-space feature quantity $V_P$ is a feature vector including image information subjected to a partial differential Gaussian operation up to a fourth order for respective dimensions of x, y, and t. The number of dimensions of the feature vector is thirty-four dimensions calculated as $_3C_2+_4C_2+_5C_2+_6C_2=34$.

Feature quantities obtained at respective ST feature points (a total number of the ST feature points is N) of an i-th model moving image $I_{MODEL}^{[i]}(x,y,t)$ obtained by the processing described above are represented as $V_{MODEL}^{[i]}\{V_1^{[i]}, V_2^{[i]}, \ldots, V_N^{[i]}\}$ on the assumption that a feature quantity of an ST feature point $P_j^{[i]}$ is $V_j^{[i]}$.

The feature-quantity extracting unit 44 supplies the ST feature point $P_{MODEL}^{[i]}$ extracted from the model moving image $I_{MODEL}^{[i]}$ and the feature quantity $V_{MODEL}^{[i]}$ thereof to a dictionary registering unit 61 of the recognition processing unit 22 as a model action $MODEL^{[i]}=(P_j^{[i]},V_j^{[i]})$.

Respective units of the recognition processing unit 22 are explained below.

The recognition processing unit 22 includes the dictionary registering unit 61, an input-moving-image buffering unit 62, a pre-processing executing unit 63, a feature-point extracting unit 64, a feature-quantity extracting unit 65, a feature-quantity comparing unit 66, a posture-parameter estimating unit 67, and a recognition-result generating unit 68.

The dictionary registering unit 61 of the recognition processing unit 22 stores, in a form that can be referred to during recognition processing, the model action $MODEL^{[i]}=(P_j^{[i]}, V_j^{[i]})$ supplied from the feature-quantity extracting unit 44 of the feature-extraction processing unit 21.

The input-moving-image buffering unit 62 acquires and buffers input moving image data (hereinafter also referred to as input moving image). The input moving image data is a recognition object for recognizing presence or absence of a predetermined action using the model action $MODEL^{[i]}=(P_j^{[i]},V_j^{[i]})$ stored in the dictionary registering unit 61. The input moving image buffered by the input-moving-image buffering unit 62 is represented as $I_{INPUT}(x,y,t)$.

The input-moving-image buffering unit 62 may incorporate a camera, which can pick up a moving image, and acquire moving image data according to an instruction of the user, for example, using a user interface such as a recording start and end button. Alternatively, the input-moving-image buffering unit 62 may acquire moving image data from an external apparatus via wire or wirelessly.

When the recognition processing in the recognition processing unit 22 takes a form of sequential recognition, the input-moving-image buffering unit 62 buffers, as an input moving image, at least an image sequence from a latest frame to a frame that is recognition object time length (a predetermined number of frames) earlier than the latest frame. The input-moving-image buffering unit 62 may buffer a recognition object image sequence of predetermined time as an input moving image according to, for example, an instruction of the user inputted by using the user interface such as the recording start and end button.

The pre-processing executing unit 63 separates an action portion and a background portion in the input moving image. A method of separation may be an arbitrary method. When the recognition processing is not sequential recognition, the pre-processing executing unit 63 may separate the action portion and the background portion using a method same as the method used by the pre-processing executing unit 42 of the feature-extraction processing unit 21. Even if the pre-processing unit 63 is omitted, the recognition processing in the recognition processing unit 22 can be executed.

When feature points and feature quantities are extracted from an input moving image including a background portion not subjected to pre-processing, extraction time for feature points and feature quantities and time for comparison processing for the feature quantities increase. However, since an action does not finally coincide with the model action $MODEL^{[i]}=(P_j^{[i]},V_j^{[i]})$ registered in the dictionary registering unit 61, the recognition processing can be executed. Specifically, the feature quantities are compared by processing described later and pairs of corresponding feature quantities are generated. However, when the pre-processing is not performed, it is likely that a large number of pairs of wrong feature quantities are generated. However, it is expected that most of the pairs of wrong feature quantities are removed as outliers by the processing described later. Therefore, even if the pre-processing is not performed, the recognition processing is correctly executed. It goes without saying that the pre-processing is suitably performed because the processing time is reduced and the recognition accuracy is further improved.

Regardless of whether the pre-processing is performed by the pre-processing executing unit 63, the input moving image supplied to the feature-point extracting unit 64 is represented as $I_{INPUT}(x,y,t)$.

The feature-point extracting unit 64 extracts feature points from the input moving image $I_{INPUT}(x,y,t)$ using a method same as the method used by the feature-point extracting unit 43 and supplies information on the extracted feature points to the feature-quantity extracting unit 65. M feature points (ST feature points) of the input moving image $I_{INPUT}(x,y,t)$ extracted by the feature-point extracting unit 64 are represented as $Q_{INPUT}=\{Q_1,Q_2,\ldots,Q_M\}$.

The feature-quantity extracting unit 65 extracts feature quantities using a method same as the method used by the feature-quantity extracting unit 44 at the respective feature points $Q_{INPUT}=\{Q_1,Q_2,\ldots,Q_M\}$ of the input moving image $I_{INPUT}(x,y,t)$ extracted by the feature-point extracting unit 64. Feature quantities at the respective M feature points $Q_{INPUT}=\{Q_1,Q_2,\ldots,Q_M\}$ of the input moving image $I_{INPUT}(x,y,t)$ extracted by the feature-quantity extracting unit 65 are represented as $W_{INPUT}=\{W_1,W_2,\ldots,W_M\}$ on the assumption that a feature quantity at a feature point $Q_k$ is $W_k$.

The feature-quantity extracting unit 65 buffers, in a form that can be referred to, feature point and feature quantity information $INPUT=(Q_k,W_k)$ (k is an integer equal to or larger than 1 and equal to or smaller than M) of this input moving image and supplies the feature point and feature quantity information $INPUT=(Q_k,W_k)$ to the feature-quantity comparing unit 66.

The feature-quantity comparing unit 66 performs processing for matching the feature point and feature quantity information $INPUT=(Q_k,W_k)$ supplied from the feature-quantity extracting unit 65 and the model action $MODEL^{[i]}=(P_j^{[i]}, V_j^{[i]})$ registered in the dictionary registering unit 61.

For example, it is assumed that L model actions are registered in the dictionary registering unit 61. In other words, it is assumed that, in the model action $MODEL^{[i]}=(P_j^{[i]},V_j^{[i]})$, $1 \leq i \leq L$.

The feature-quantity comparing unit 66 extracts a pair group of feature quantities with high similarity degrees in the feature point and feature quantity information $INPUT=(Q_k, W_k)$ supplied from the feature-quantity extracting unit 65 and the model action $MODEL^{[i]}=(P_j^{[i]},V_j^{[i]})$ registered in the dictionary registering unit 61. A pair group of feature points corresponding to the extracted pair group of feature quantities is referred to as a candidate corresponding feature point pair group.

Various scales can be used for a similarity scale or a non-similarity scale used for extracting a pair group of feature points with high similarity degrees. In an example explained below, an arbitrary norm is used as a non-similarity degree.

A non-similarity degree $D(V_j^{[i]}, W_k)$ between a feature quantity $V_j^{[i]}$ of a j-th feature point of an i-th model moving image and a feature quantity $W_k$ of a k-th feature point of an input moving image is defined by the following formula (12).

$$D(V_j^{[i]}, W_k) = \text{norm}(V_j^{[i]}, W_k) \tag{12}$$

The feature-quantity comparing unit 66 calculates the non-similarity degree $D(V_j^{[i]}, W_k)$ defined by Formula (12) in all combinations of $V_j^{[i]}$ and $W_k$. The feature-quantity comparing unit 66 can set, as a candidate corresponding feature point group of $P_j^{[i]}$, on the basis of a value of the non-similarity degree $D(V_j^{[i]}, W_k)$ defined by Formula (12), a candidate corresponding feature point group corresponding to the feature point $P_j^{[i]}$, for example, feature points $Q_k$ corresponding to K (e.g., K is a plural number about 3 and is suitably a value not so large) feature quantity $W_k$ with smallest $D(V_j^{[i]}, W_k)$. The feature-quantity comparing unit 66 can also set, as the candidate corresponding feature point group of $P_j^{[i]}$, feature points $Q_k$ corresponding to all feature quantities $W_k$, for which a value of the non-similarity degree $D(V_j^{[i]}, W_k)$ defined by Formula (12) is lower than a predetermined threshold $\gamma$.

$P_j^{[i]}$ in the candidate corresponding feature point group obtained by the feature-quantity comparing unit 66 and respective corresponding feature points Qa are paired and represented as a candidate corresponding feature point pair $[P_j^{[i]}, Qa]$. A candidate corresponding feature point pair group concerning a input moving image and an i-th model action is represented as $CMP^{[i]}$, i.e., the pair group $CMP^{[i]} = \{(P_j^{[i]}, Qa) | Qa: \text{corresponding feature points of } P_j^{[i]}\}$. In this case, "i" is an integer from 1 to L and "j" is an integer from 1 to N.

The feature-quantity comparing unit 66 supplies information on the candidate corresponding feature point pair group $CMP^{[i]}$ obtained by the processing described above to the posture-parameter estimating unit 67.

The posture-parameter estimating unit 67 performs, after removing outliers of the candidate corresponding feature point pair group $CMP^{[i]}$ obtained by the feature-quantity comparing unit 66, judgment on presence or absence of detection of model actions and posture parameter estimation for model actions corresponding to models for which model actions are detected.

In the processing for extracting the candidate corresponding feature point pair group CMP[i] obtained by the feature-quantity comparing unit 66, positional information of feature points where feature quantities are extracted is not used. Therefore, macroscopically, in the candidate corresponding feature point pair group CMP[i], there are not only true corresponding feature point pairs (inliers), a positional relation among corresponding feature points of which does not contradict a posture of a model action on an input moving image (a model posture), but also a large number of false corresponding feature point pairs (outliers) that are similar concerning any feature quantity obtained from local image information but do not correspond to one another from the viewpoint of a temporal-spatial geometrical arrangement. As described above, when the pre-processing by the pre-processing executing unit 63 is omitted, likelihood of mixing of outliners increases. In other words, when the judgment on presence or absence of a model action in the input moving image and the posture estimation in the input moving image are performed by using all candidate corresponding feature point pair groups CMP[i] obtained by the feature-quantity comparing unit 66, a recognition result is extremely bad because of the mixing of outliners.

Therefore, the posture-parameter estimating unit 67 calculates, by forming a time-space transformation hypothesis that "a model action appears in an input moving image while being subjected to temporal-spatial image transformation (i.e., three-dimensional image transformation)", time-space image transformation parameter most likely to be correct and a subset of candidate corresponding feature point pair groups $CMP^{[i]}$ for determining the parameters out of the candidate corresponding feature pair groups $CMP^{[i]}$. The posture-parameter estimating unit 67 sets the subset as the recognition corresponding feature point pair group $RMP^{[i]}$ for calculating a final recognition result.

A concept of a transformation hypothesis in a two-dimensional still image is described in, for example, JP-A-2006-065399. However, in this embodiment, the concept is applied to a moving image by extending the concept to a time-space formed by two dimensions and time, i.e., three dimensions with time "t" set as a dimension in a spatial depth direction with respect to an image plane x-y rather than simply extending the concept from two dimensions (a plane) to three dimensions (a space).

As image transformation executed by the posture-parameter estimating unit 67, Euclidian transformation, similar transformation, affine transformation, projection transformation, and the like, all of which are extended to three-dimensional image transformation, can be used. As an example of the image transformation explained below in detail, the posture-parameter estimating unit 67 performs posture estimation under constraint of three-dimensional affine transformation.

The three-dimensional affine transformation executed by the posture-parameter estimating unit 67 is transformation for allowing shearing deformation in similar transformation, which is performed by adding expansion and reduction transformation to translation and rotational transformation (Euclidian transformation) in three dimensions including two dimensions of x-y and time "t". In the three-dimensional affine transformation, points arranged on a straight line in an original figure are still arranged on a straight line even after transformation and parallel lines are still parallel lines even after transformation, i.e., a geometrical characteristic is maintained. When a coordinate of a point before transformation is represented as (x,y,t) and a coordinate of a point after transformation is represented as (x',y',t'), the three-dimensional affine transformation is represented by the following formula (13).

$$[x' \ y' \ t' \ 1] = [x \ y \ t \ 1] \begin{bmatrix} a_1 & a_4 & a_7 & 0 \\ a_2 & a_5 & a_8 & 0 \\ a_3 & a_6 & a_9 & 0 \\ b_1 & b_2 & b_3 & 1 \end{bmatrix} \tag{13}$$

A certain corresponding feature point pair group MP, which is a subset of the candidate corresponding feature point pair groups CMP[i], is extracted by extracting a part of the candidate corresponding feature point pair groups CMP[i]. Concerning the extracted corresponding feature point pair group MP, a coordinate of a feature point P having a model action feature quantity included in the corresponding feature point pair group MP is represented as $(x_s, y_s, t_s)$ and a coordinate of a feature point Q having an input moving image feature quantity corresponding to the feature point P is represented as $(x_s', y_s', t_s')$. Then, an affine parameter of three dimensions of x-y-t estimated from the corresponding feature point pair group MP is calculated from the following formula (14).

$$\begin{bmatrix} x_1 & y_1 & t_1 & 0 & 0 & 0 & 0 & 0 & 0 & 1 & 0 & 0 \\ 0 & 0 & 0 & x_1 & y_1 & t_1 & 0 & 0 & 0 & 0 & 1 & 0 \\ 0 & 0 & 0 & 0 & 0 & 0 & x_1 & y_1 & t_1 & 0 & 0 & 1 \\ x_2 & y_2 & t_2 & 0 & 0 & 0 & 0 & 0 & 0 & 1 & 0 & 0 \\ 0 & 0 & 0 & x_2 & y_2 & t_2 & 0 & 0 & 0 & 0 & 1 & 0 \\ 0 & 0 & 0 & 0 & 0 & 0 & x_2 & y_2 & t_2 & 0 & 0 & 1 \\ & & & & & \vdots & & & & & & \end{bmatrix} \begin{bmatrix} a_1 \\ a_2 \\ a_3 \\ a_4 \\ a_5 \\ a_6 \\ a_7 \\ a_8 \\ a_9 \\ b_1 \\ b_2 \\ b_3 \end{bmatrix} = \begin{bmatrix} x'_1 \\ y'_1 \\ t'_1 \\ x'_2 \\ y'_2 \\ t'_2 \\ \vdots \end{bmatrix} \quad (14)$$

In Formula (14), $a_1$, $a_2$, $a_3$, $a_4$, $a_5$, $a_6$, $a_7$, $a_8$, and $a_9$ represent parameters for determining rotation, expansion, reduction, and shearing deformation and $b_1$, $b_2$, and $b_3$ represent parameters for determining translation.

When the variables in Formula (14) are replaced as indicated by the following formula (15), a least square solution thereof is represented by the following formula (16).

$$C\Theta = d \quad (15)$$

$$\Theta = [C^T C]^{-1} C^T d \quad (16)$$

The number of determination parameters in Formula (14) is twelve, four or more sets of corresponding feature point pairs are necessary in the corresponding feature pair group MP in order to determine a three-dimensional affine transformation parameter formed by two dimensions and time. Therefore, when only three or less corresponding feature point pairs are present in the candidate corresponding feature point pair group CMP[i], the posture-parameter estimating unit 67 notifies the recognition-result generating unit 68 that only the three or less corresponding feature point pairs are present. The recognition-result generating unit 68 recognizes that no model is detected for the i-th model action.

On the other hand, when four or more corresponding feature point pairs are present in the candidate corresponding feature point pair group CMP[i], it is possible to obtain a result indicating that the i-th model action corresponds to the input moving image at least to some extent.

When a corresponding feature point pair group R is selected at random from the candidate corresponding feature point pair group CMP[i] and one or more outliers are mixed in the corresponding feature point pair group R, three-dimensional image transformation parameters thereof are projected to scatter on a parameter space. On the other hand, when the corresponding feature point pair group R is selected at random and the corresponding feature point pair group R includes only inliers, three-dimensional image transformation parameters thereof are collectively projected in a range of close distances from one another on the parameter space. In other words, all corresponding feature point pairs as inliers are extremely similar to true affine transformation parameters in a posture in the input moving image of the model action. Therefore, three-dimensional image transformation parameters thereof are projected in close distances from one another on the parameter space.

Therefore, when processing for selecting the corresponding feature point pair group R at random from the candidate corresponding feature point pair group CMP[i] and projecting three-dimensional image transformation parameters thereof on the parameter space is repeated, the inliers form a dense cluster (having a large number of members) on the parameter space and the outliers appear to scatter. In other words, if clustering is performed on the parameter space, it is possible to recognize elements of a cluster having a largest number of members. The posture-parameter estimating unit 67 can recognize the elements in this cluster as inliers.

The posture-parameter estimating unit 67 can use an NN (Nearest Neighbor) method as a clustering method on the parameter space.

The posture-parameter estimating unit 67 selects four or more pairs at random from the candidate corresponding feature point pair group CMP[i] as a corresponding feature point pair group $R_1$, calculates three-dimensional affine transformation parameters $\Theta_{R1}$ using Formulas (14) to (16), and projects the three-dimensional transformation parameters $\Theta_{R1}$ on the parameter space. The posture-parameter estimating unit 67 sets a variable NZ representing the number of clusters to 1 and forms a cluster $Z_1$ including the three-dimensional affine transformation parameters $\Theta_{R1}$ as centroids on a three-dimensional affine transformation parameter space $\Theta$. Specifically, the posture-parameter estimating unit 67 sets a centroid $C_1$ of the cluster $Z_1$ as $\Theta_{R1}$ and sets a variable $nz_1$ representing the number members of the cluster to 1.

The posture-parameter estimating unit 67 selects four or more pairs at random from the candidate corresponding feature point pair group CMP[i] as the next corresponding feature point pair group $R_2$, calculates three-dimensional affine transformation parameters $\Theta_{R2}$ using Formulas (14) to (16), and projects the three-dimensional affine transformation parameters $\Theta_{R2}$ on the parameter space. The posture-parameter estimating unit 67 clusters the affine transformation parameter space according to the NN method. When a new cluster is generated as a result of the clustering, the posture-parameter estimating unit 67 sets the cluster as a new cluster $Z_2$. When no new cluster is generated, the posture-parameter estimating unit 67 sets the number of members of the cluster $C_1$ to $nz_1=2$.

The posture-parameter estimating unit 67 continuously selects four or more pairs at random from the candidate corresponding feature point pair group CMP[i] until a predetermined condition is satisfied, calculates three-dimensional affine transformation parameters using Formula (14) to (16), projects the three-dimensional affine transformation parameters on the parameter space, and clusters the affine transformation parameter space according to the NN method.

The clustering is specifically explained. The posture-parameter estimating unit 67 calculates, according to the following formula (17), a minimum distance dmin among distances d $(\Theta_{Rcnt}, C_g)$ between three-dimensional affine transformation parameters $\Theta_{Rcnt}$ (cnt is a variable indicating how many times processing is performed) and centroids $C_g$ (g is a value in a range of $1 \leq g \leq NZ$) of respective clusters $Z_g$ (g is a value in a range of $1 \leq g \leq NZ$).

$$D\min = \min\{d(\Theta_{Rcnt}, C_g)\} \quad (17)$$

As the distance $d(\Theta_{Rcnt}, C_g)$ set as a clustering reference, for example, a Euclidian distance can be used. As the centroids $C_g$, an average vector of cluster members can be used.

If dmin is smaller than a predetermined threshold E, the posture-parameter estimating unit 67 causes $\Theta_{Rcnt}$ to belong to the cluster $Z_g$ at dmin and updates the centroids $C_g$ of the clusters $Z_g$ with all members including $\Theta_{Rcnt}$ (the number of members $nz_g$ of the clusters $Z_g$ is incremented by 1). On the other hand, if dmin is equal to or larger than E, the posture-parameter estimating unit 67 forms new clusters $Z_{g+1}$ including three-dimensional affine transformation parameters $\Theta_{Rcnt}$ as centroids $C_{g+1}$ on the three-dimensional affine transformation parameter space, sets the number of members $nz_g$ of the clusters as $nz_{g+1}=1$, and sets the number of clusters NZ to NZ+1.

The posture-parameter estimating unit 67 judges whether the predetermined condition is satisfied. The predetermined condition is that, for example, a largest number of members exceeds a predetermined threshold (e.g., fifteen) and a difference between the largest number of members and a second largest members exceeds a predetermined threshold (e.g., three) or the number of times of repetition of the processing exceeds a predetermined threshold (e.g., 5000 times). When the predetermined condition is not satisfied, the posture-parameter estimating unit 67 increments a counter for counting the number of times of repetition by 1 and repeats the processing for selecting four or more pairs at random from the posture corresponding feature point pair group $CMP^{[i]}$, calculating three-dimensional affine transformation parameters using Formulas (14) to (16), projecting the three-dimensional affine transformation parameters on the parameter space, and clustering the affine transformation parameter space according to the NN method. On the other hand, when the predetermined condition is satisfied, the posture-parameter estimating unit 67 holds, as a recognition corresponding feature point pair group $RMP^{[i]}$ for the i-th model action, a corresponding feature point pair group that is a member of a cluster Zmax having a largest number of members and holds a centroid Cmax of the cluster Zmax as a recognition posture parameter $\theta^{\sim[i]}$.

The posture-parameter estimating unit 67 sequentially executes the processing on L model actions. The posture-parameter estimating unit 67 supplies recognition corresponding feature point pair groups $RMP^{[i]}$ and recognition posture parameters $\theta^{\sim[i]}$ of the respective L model actions to the recognition-result generating unit 68. When only three or less corresponding feature point pairs are present in the candidate corresponding feature point pair group $CMP^{[i]}$ in any one of the model actions, the posture-parameter estimating unit 67 supplies the recognition corresponding feature point pair group $RMP^{[i]}$=NULL and the recognition posture parameter $\theta^{\sim[i]}$=NULL to the recognition-result generating unit 68.

In the clustering method explained above, for example, the Euclidian distance is used as the distance scale $d(\Theta_{Rcnt},C_g)$ serving as the clustering reference and the average vector of cluster members is used as a centroid. However, it goes without saying that a Mahalanobis distance calculated by taking into account the scattering of clusters can also be used as a distance scale and an average vector of cluster members and information on the scattering can also be used as a centroid.

Further, in the clustering method, the distance $d(\Theta_{Rcnt},C_g)$ between a cluster and a parameter vector is calculated with the same weight for all twelve dimensions of the three-dimensional affine transformation parameters $\Theta_{Rcn}$ and the judgment on whether the cluster is updated or a new cluster is created is performed by using an identical threshold E in all the dimensions. However, among the twelve dimensions of the three-dimensional affine transformation parameters $\Theta_{Rcnt}$, in first nine dimensions formed by $a_1$ to $a_9$ and the remaining three dimensions formed by $b_1$ to $b_3$ in Formula (14), ranges are extremely different because $b_1$ to $b_3$ are parameters representing translation in a time space and $a_1$ to $a_9$ are parameters representing spatial deformation mappings other than translation such as rotation, expansion and reduction, and shearing deformation.

Therefore, for example, the posture-parameter estimating unit 67 may normalize the ranges by independently multiplying respective dimensions of the three-dimensional affine transformation parameters $\Theta_{Rcnt}$ with a predetermined normalization coefficient, project the three-dimensional affine transformation parameters $\Theta_{Rcnt}$ after the normalization on the parameter space, and performs clustering. As a normalization coefficient nf, for example, nf is 1.0 for the first nine dimensions formed by $a_1$ to $a_9$. The normalization coefficient nf for $b_1$ of the tenth dimension can be set as an inverse number of the number of horizontal pixels of an assumed moving image (e.g., if a size of the moving image is a VGA (Video Graphics Array) size, nf=1/640). The normalization coefficient nf for $b_2$ of the eleventh dimension can be set to an inverse number of the number of vertical pixels of the assumed moving image (e.g., if the size of the moving image is the VGA size, nf=1/480). The normalization coefficient nf for $b_3$ of the twelfth dimension can be set to an inverse number of time length of the assumed moving image.

Further, for example, the posture-parameter estimating unit 67 may calculate the distance $d(\Theta_{Rcnt},C_g)$ between a cluster and a parameter vector independently for the first nine dimensions formed by $a_1$ to $a_9$ and the remaining three dimensions formed by $b_1$ to $b_3$, separately provide a threshold $E^{<1-9>}$ and a threshold $E^{<10-12>}$ for a distance $d(\Theta_{Rcnt}^{<1-9>},C_g^{<1-9>})$ and a distance $d(\Theta_{Rcnt}^{<10-12>},C_g^{<10-12>})$, and, if there is a cluster for which judgment of both the thresholds is satisfied, update the cluster and, if there is no such a cluster, generate a new cluster. As an example of setting of the thresholds, for example, when the threshold $E^{<1-9>}$ is 1, the threshold $E^{<10-12>}$ can be set to 5.

In this way, the posture-parameter estimating unit 67 supplies, in each of the L model actions, a subset of the candidate corresponding feature point pair group $CMP^{[i]}$ recognized as inliers, i.e., the recognition corresponding feature point pair group $RMP^{[i]}$ and the recognition posture parameters $\theta^{\sim[i]}$ for calculating a final recognition result to the recognition-result generating unit 68.

The recognition-result generating unit 68 generates a final recognition result of the model action on the basis of the recognition corresponding feature point pair group $RMP^{[i]}$ and the recognition posture parameters $\theta^{\sim[i]}$ supplied from the posture-parameter estimating unit 67.

Depending on a purpose of use, a user or an application using the recognition result may desire that only a model action considered to have a highest recognition result is outputted, desire that candidates of plural recognition model actions attached with reliability degrees are outputted, learn only presence or absence of detection, desire that, when a corresponding action is detected, not only a result of the detection but also posture parameters (three-dimensional image transformation parameters) of the detected model action in an input moving image are outputted.

As described above, when the number of elements exceeds four in none of the recognition corresponding feature point pair groups $RMP^{[i]}$ of all the model actions, i.e., the recognition corresponding feature point pair group $RMP^{[i]}$=NULL and the recognition posture parameters $\theta^{\sim[i]}$=NULL, the recognition-result generating unit 68 outputs a recognition result as "not detected". In other cases, since any one of the model actions is recognized, the recognition-result generating unit 68 generates a detection result in a form based on a request of the user or the application using the recognition result and outputs the detection result.

The recognition-result generating unit 68 can output, as detected model actions, for example, all model actions "i" in which the numbers of elements (the number of corresponding feature point pairs) of the recognition corresponding feature point pair group RMP$^{[i]}$ are equal to or larger than a predetermined threshold.

The recognition-result generating unit 68 can output, as a detected model action, for example, the model action "i" in which the number of elements of the recognition corresponding feature point pair group RMP$^{[i]}$ is the largest.

The recognition-result generating unit 68 can sort, in order from one with a largest number of elements, for example, all the model actions "i" in which the numbers of elements (the number of corresponding feature point pairs) of the recognition corresponding feature point pair group RMP$^{[i]}$ are equal to or larger than the predetermined threshold and output, as a detection result, all the detected model actions "i" and order of the model actions "i".

The recognition-result generating unit 68 can set, for example, all the model actions "i" in which the numbers of elements (the number of corresponding feature point pairs) of the recognition corresponding feature point pair group RMP$^{[i]}$ are equal to or larger than the predetermined threshold as detected model actions, set a ratio of the number of elements of the recognition corresponding feature point pair group RMP$^{[i]}$ of the respective model actions with respect to a sum of the numbers of elements of the detected model actions "i" as a reliability degree, and output all the detected model actions "i" and the reliability degree thereof as a detection result.

When an output of posture parameters (three-dimensional image transformation parameters) of detected model actions is requested, the recognition-result generating unit 68 outputs all the detected model actions "i" and posture parameters of the model actions "i" as a recognition result.

The recognition-result generating unit 68 can perform, for example, using all elements of RMP$^{[i]}$ of the detected model actions "i", least square estimation of parameters using Formulas (14) to (16) and output a result of the least square estimation as recognition posture parameters $\Theta^{[i]}$ of the detected model actions.

The recognition-result generating unit 68 may output, for example, recognition posture parameters $\theta^{-[i]}$ of the detected model actions "i" as recognition posture parameters $\Theta^{[i]}$ of the detected model actions.

Feature extraction processing executed by the feature-extraction processing unit 21 of the recognition processing apparatus 11 is explained with reference to a flowchart shown in FIG. 6.

In step S11, the model-moving-image recording unit 41 records moving image data for acquiring a feature quantity serving as a model of recognition processing.

In step S12, the model-moving-image recording unit 41 receives, on the basis of an operation input of the user inputted form a not-shown operation input unit, start time and end time of a moving image used for registration, records moving image data of that portion of the moving image as a model moving image, and supplies the moving image data to the pre-processing executing unit 42.

In step S13, the pre-processing executing unit 42 executes pre-processing for separating an action portion and a background portion in the model moving image.

As described above, a method of separating the action portion and the background portion may be an arbitrary method. However, for example, as described above, the morphological expansion processing (e.g., the 8-neighbor expansion processing) for an area corresponding to the action portion is suitably performed because noise caused in an area that should be detected as the action portion can be removed from a binary image for separation of the action portion and the background portion. Moreover, the morphological contraction processing (e.g., the 8-neighbor contraction processing) is suitably applied to the binary image after the expansion processing because it is possible to limitlessly eliminate the likelihood that feature points and feature quantities of a portion corresponding to a background around the action portion are extracted, and accuracy of recognition is improved.

In step S14, the feature-point extracting unit 43 extracts feature points from the model moving image subjected to the pre-processing and supplies information on the extracted feature points to the feature-quantity extracting unit 44.

The feature-point extracting unit 43 may extract feature points using any one of various methods already publicly known. However, a feature point extracting method robust against deformation of a time-space, i.e., three-dimensions with time "t" set as a dimension in a spatial depth direction with respect to the image plane x-y explained with reference to FIG. 2 is suitably used because accuracy of recognition is improved. The feature-point extracting unit 43 can extract, for example, the ST feature points described above.

In step S15, the feature-quantity extracting unit 44 extracts feature quantities at the feature points of the model moving image extracted and supplied by the feature-point extracting unit 43.

The feature-quantity extracting unit 44 may extract feature quantities using any one of various methods already publicly known. The feature-quantity extracting unit 44 can extract feature quantities using, for example, the time-space feature quantity $V_P$ indicated by Formulas (10) and (11).

In step S16, the feature-quantity extracting unit 44 supplies the extracted feature quantities at the feature points of the model moving image to the dictionary registering unit 61 of the recognition processing unit 22, causes the dictionary registering unit 61 to store the feature points and the feature quantities for each model moving image, and finishes the processing.

According to such processing, it is possible to extract feature points and feature quantities of a model moving image and store the feature points and the feature quantities for recognition without preparing a large amount of model data or performing complicated learning processing.

The recognition processing executed by the recognition processing unit 22 of the recognition processing apparatus 11 is explained with reference to a flowchart shown in FIG. 7. When this processing is executed, feature points and feature quantities of a model moving image supplied from the feature-point extracting unit 43 of the feature-extraction processing unit 21 are stored in the dictionary registering unit 61 of the recognition processing unit 22 in a form that can be referred to during the recognition processing.

In step S41, the input-moving-image buffering unit 62 acquires input moving image data and buffers the input moving image data.

In step S42, the pre-processing executing unit 63 executes pre-processing for separating an action portion and a background portion in an input moving image.

The pre-processing executing unit 63 can separate the action portion and the background portion using, for example, a method same as the method used by the pre-processing executing unit 42 of the feature-extraction processing unit 21. As described above, even if the pre-processing executing unit 63 is omitted, the recognition processing in the recognition processing unit 22 can be executed. Therefore, the processing in step S42 can be omitted.

In step S43, the feature-point extracting unit 64 extracts feature points from the input moving image using a method same as the method used by the feature-point extracting unit 43 and supplies information on the extracted feature points to the feature-quantity extracting unit 65.

In step S44, the feature-quantity extracting unit 65 extracts feature quantities at the feature points of the input moving image extracted by the feature-point extracting unit 64 using a method same as the method used by the feature-quantity extracting unit 44 and supplies the feature quantities to the feature-quantity comparing unit 66.

Figure 8:
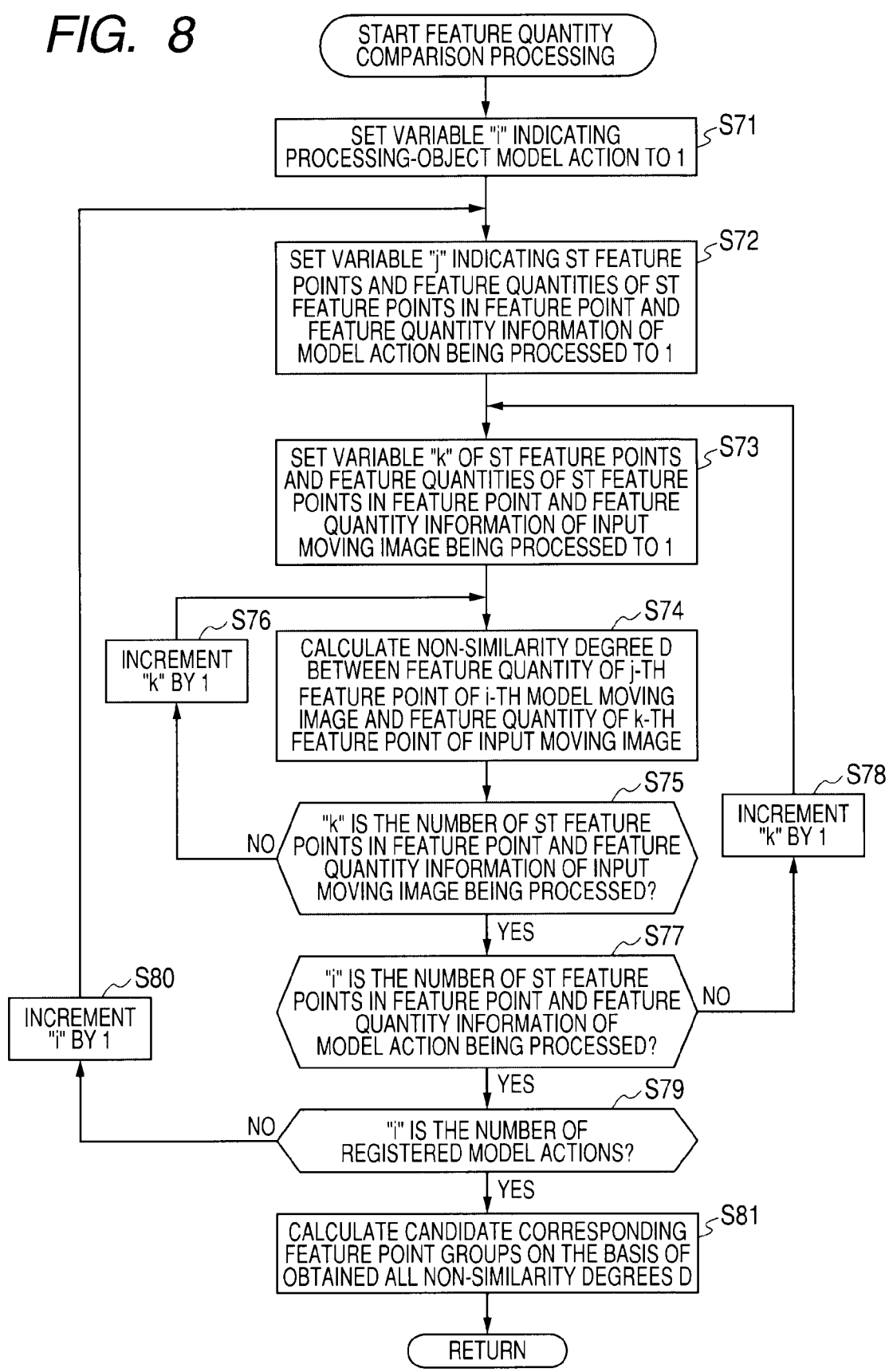
FIG. 8 is a flowchart for explaining feature quantity comparison processing.

In step S45, feature quantity comparison processing explained later with reference to a flowchart shown in FIG. 8 is executed.

Figure 9:
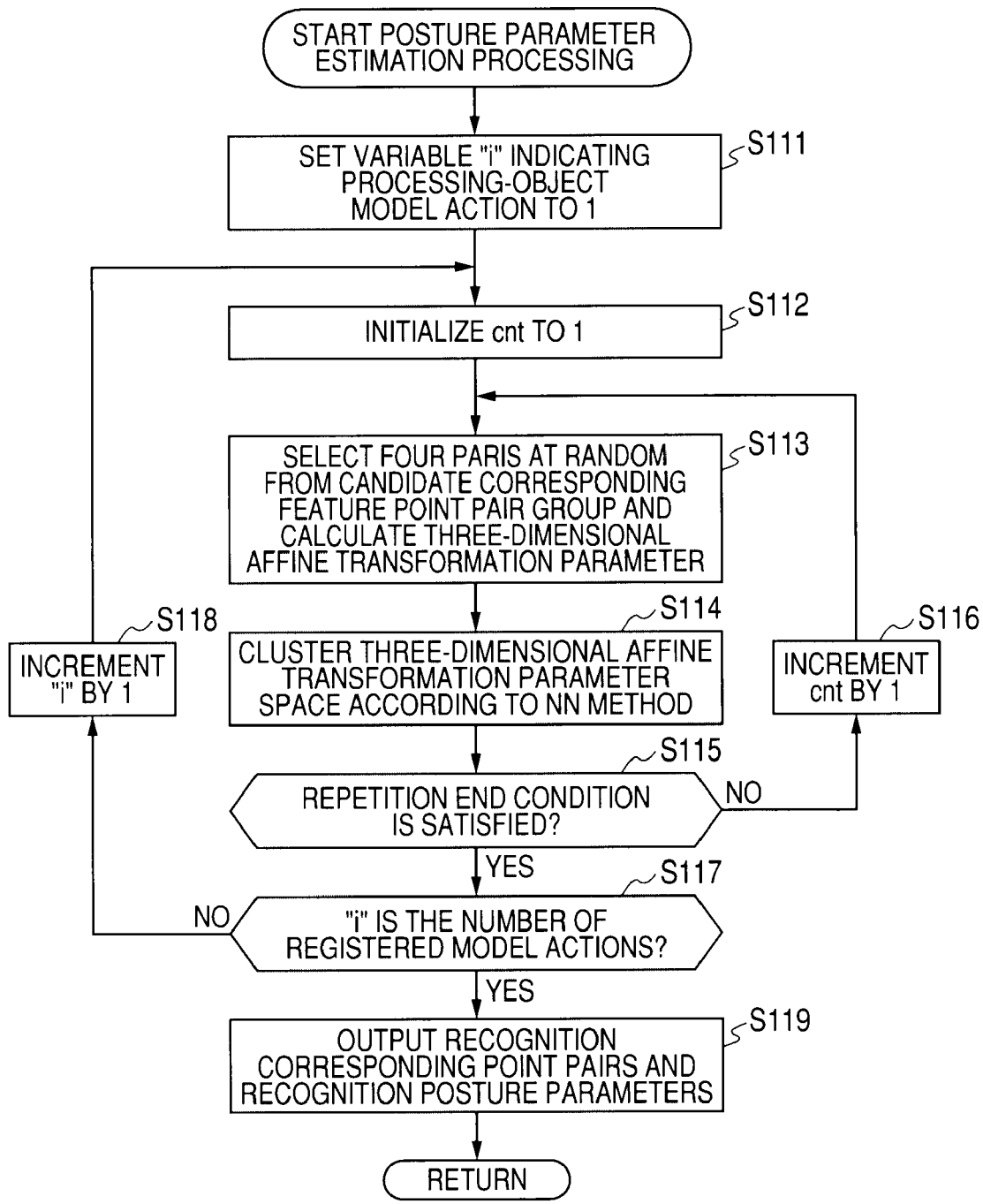
FIG. 9 is a flowchart for explaining posture parameter estimation processing.

In step S46, posture parameter estimation processing explained later with reference to a flowchart shown in FIG. 9 is executed.

In step S47, the recognition-result generating unit 68 generates, on the basis of a recognition corresponding feature point pair group and the recognition posture parameters $\theta^{-[t]}$ supplied from the posture-parameter estimating unit 67, a final recognition result of a model action in a form based on a request of the user or the application using the recognition result, outputs the recognition result, and finishes the processing.

According to such processing, processing for recognizing whether an action included in an input moving image coincides with a registered model action is performed and a recognition result is outputted in a form based on a request of the user or the application using the recognition result.

As described above, even if the pre-processing executing unit 63 is omitted, the recognition processing in the recognition processing unit 22 can be executed. Therefore, the processing in step S42 can be omitted. Even if the processing in step S42 is omitted, since outliers are removed, pairs including feature points extracted from the background portion are removed. Therefore, the recognition result is not extremely deteriorated. When the processing in step S42 is omitted, a threshold in generating a candidate corresponding feature point pair group is suitably set low compared with the threshold set when the processing in step S42 is performed.

The feature quantity comparison processing executed in step S45 shown in FIG. 7 is explained with reference to a flowchart shown in FIG. 8.

In step S71, the feature-quantity comparing unit 66 sets a variable "i" indicating a processing-object model action to 1.

In step S72, the feature-quantity comparing unit 66 sets a variable "j" indicating ST feature points and feature quantities of the ST feature points in feature point and feature quantity information of a model action being processed to 1.

In step S73, the feature-quantity comparing unit 66 sets a variable k indicating ST feature points and feature quantities of the ST feature points in feature point and feature quantity information of an input moving image being processed to 1.

In step S74, the feature-quantity comparing unit 66 calculates, for example, using Formula (12), a non-similarity degree D between a feature quantity $V_j^{[i]}$ of a j-th feature point of an i-th model moving image and a feature quantity Wk of a k-th feature point of an input moving image.

In step S75, the feature-quantity comparing unit 66 judges whether k is the number of the ST feature points in the feature point and feature quantity information of the input moving image being processed.

When it is judged in step S75 that k is not the number of the ST feature points in the feature point and feature quantity information of the input moving image being processed, in step S76, the feature-quantity comparing unit 66 increments "k" by 1. The processing returns to step S74 and the processing in step S74 and subsequent steps is repeated.

When it is judges in step S75 that "k" is the number of the ST feature points in the feature point and feature quantity information of the input moving image being processed, in step S77, the feature-quantity comparing unit 66 judges whether "j" is the number of the ST feature points in the feature point and feature quantity information of the model action being processed.

When it is judged in step S77 that "j" is not the number of the ST feature points in the feature point and feature quantity information of the model action being processed, in step S78, the feature-quantity comparing unit 66 increments "j" by 1. The processing returns to step S73 and the processing in step S73 and subsequent steps is repeated.

When it is judged in step S77 that "j" is the number of the ST feature points in the feature point and feature quantity information of the model action being processed, in step S79, the feature-quantity comparing unit 66 judges whether "i" is the number of registered model actions.

When it is judged in step S79 that "i" is not the number of registered model actions, in step S80, the feature-quantity comparing unit 66 increments "i" by 1. The processing returns to step S72 and the processing in step S72 and subsequent steps is repeated.

When it is judged in step S79 that "i" is the number of registered model actions, in step S81, the feature-quantity comparing unit 66 calculates, on the basis of obtained all quantities of the non-similarity degree D, a candidate feature point group including candidates of corresponding feature points that are feature points of the input moving image corresponding to respective model feature points. The feature-quantity comparing unit 66 supplies pairs of the candidates of the model feature points and the corresponding feature points to the posture-parameter estimating unit 67 as a candidate corresponding feature point pair. The processing returns to step S45 shown in FIG. 7 and proceeds to step S46.

According to such processing, in combinations of all the feature points of the model moving image and the input moving image, for example, the non-similarity degree D explained with reference to Formula (12) is calculated and pairs of candidates of the model feature points and the corresponding feature points are obtained.

The posture parameter estimation processing executed in step S46 shown in FIG. 7 is explained below.

In step S111, the posture-parameter estimating unit 67 sets the variable "i" indicating the processing-object model action to 1.

In step S112, the posture-parameter estimating unit 67 initializes a variable cnt indicating how many times the processing is performed to 1.

In step S113, the posture-parameter estimating unit 67 selects a predetermined number of pairs (e.g., four pairs) at random from a candidate corresponding feature point pair group and calculates three-dimensional affine transformation parameters using Formulas (14) to (16).

In step S114, the posture-parameter estimating unit 67 projects the three-dimensional affine transformation parameters calculated in step S113 onto a parameter space and clusters a three-dimensional affine transformation parameter space according to the NN method. When cnt is 1, the posture-parameter estimating unit 67 generates a first cluster having the three-dimensional affine transformation parameters calculated in step S113 as centroids.

In step S115, the posture-parameter estimating unit 67 judges whether a repetition end condition is satisfied. The posture-parameter estimating unit 67 judges, for example, whether a largest number of members exceeds a predetermined threshold (e.g., fifteen) and a difference between the largest number of members and a second largest number of members exceeds a predetermined threshold (e.g., three) or whether the number of times of repletion of the processing exceeds a predetermined threshold (e.g., 5000 times).

When it is judged in step S115 that the repetition end condition is not satisfied, in step S116, the posture-parameter estimating unit 67 increments cnt by 1. The processing returns to step S113 and the processing in step S113 and subsequent steps is repeated.

When it is judged in step S115 that the repetition end condition is satisfied, in step S117, the posture-parameter estimating unit 67 judges whether "i" is the number of registered model actions.

When it is judged in step S117 that "i" is not the number of registered model actions, in step S118, the posture-parameter estimating unit 67 increments "i" by 1. The processing returns to step S112 and the processing in step S112 and subsequent steps is repeated.

When it is judged in step S117 that "i" is the number of registered model actions, in step S119, the posture-parameter estimating unit 67 sets, on the basis of a result of the clustering, for each of all the model actions, a corresponding feature point pair group including members of a cluster Zmax having a largest number of members as a recognition corresponding feature point pair group corresponding to each of the model actions. The posture-parameter estimating unit 67 outputs a centroid Cmax of the cluster Zmax to the recognition-result generating unit 68 as a recognition posture parameter. The processing returns to step S46 shown in FIG. 7 and proceeds to step S47.

According to such processing, it is possible to calculate recognition corresponding feature points corresponding to the respective model actions and recognition posture parameters.

As explained above, the recognition processing apparatus 11 executes the processing for detecting a registered action from an input image and can perform recognition from one learning sample. Therefore, unlike the recognition processing performed by using statistical learning, it is unnecessary to prepare a large amount of learning data.

In the recognition processing apparatus 11, the user can easily registers a recognition-object model action anew. Therefore, unlike a method of using statistical learning that can recognize only an action learned beforehand and a method of limiting actions and body parts for which recognition algorithms are different depending on actions that can be registered, it is possible to easily increase the number of recognition-object model actions.

The recognition processing executed by the recognition processing apparatus 11 is robust against partial hiding of an input moving image and a change in a camera view point. For example, a method of identifying body parts and a method of using a shape of a motion area or shift of the center of gravity are susceptible to image deformation. Therefore, the recognition processing executed by the recognition processing apparatus 11 is advantageous compared with these methods. In the recognition processing executed by the recognition processing apparatus 11, for example, when a hand waving action is a model action that should be recognized, it is possible to flexibly recognize the hand waving action regardless of whether a recognition object person waves the hand in a standing posture, a sitting posture, or a lying posture in an input moving image.

The recognition processing apparatus 11 is explained as one apparatus above. However, each of the feature-extraction processing unit 21 and the recognition processing unit 22 may be configured as one apparatus having the same functions.

It goes without saying that the feature extraction processing and the recognition processing do not have to be continuously performed and the feature-extraction processing unit 21 and the recognition processing unit 22 may be configured as different apparatuses, respectively, and set apart from each other. In other words, even if an apparatus corresponding to the recognition processing unit 22, in which information on feature quantities generated by an apparatus corresponding to the feature-extraction processing unit 21 is stored in the dictionary registering unit 61, is set in a place apart from the apparatus corresponding to the feature-extraction processing unit 21, the apparatus corresponding to the recognition processing unit 22 can independently perform processing for recognizing an action of an input moving image.

It is possible to cause hardware or software to execute the series of processing described above. The software is installed, from a recording medium, in a computer in which a program for the software is incorporated in dedicated hardware or, for example, a general-purpose personal computer that can execute various functions by installing various programs. In this case, the processing described above is executed by a personal computer 500 shown in FIG. 10.

Figure 10:
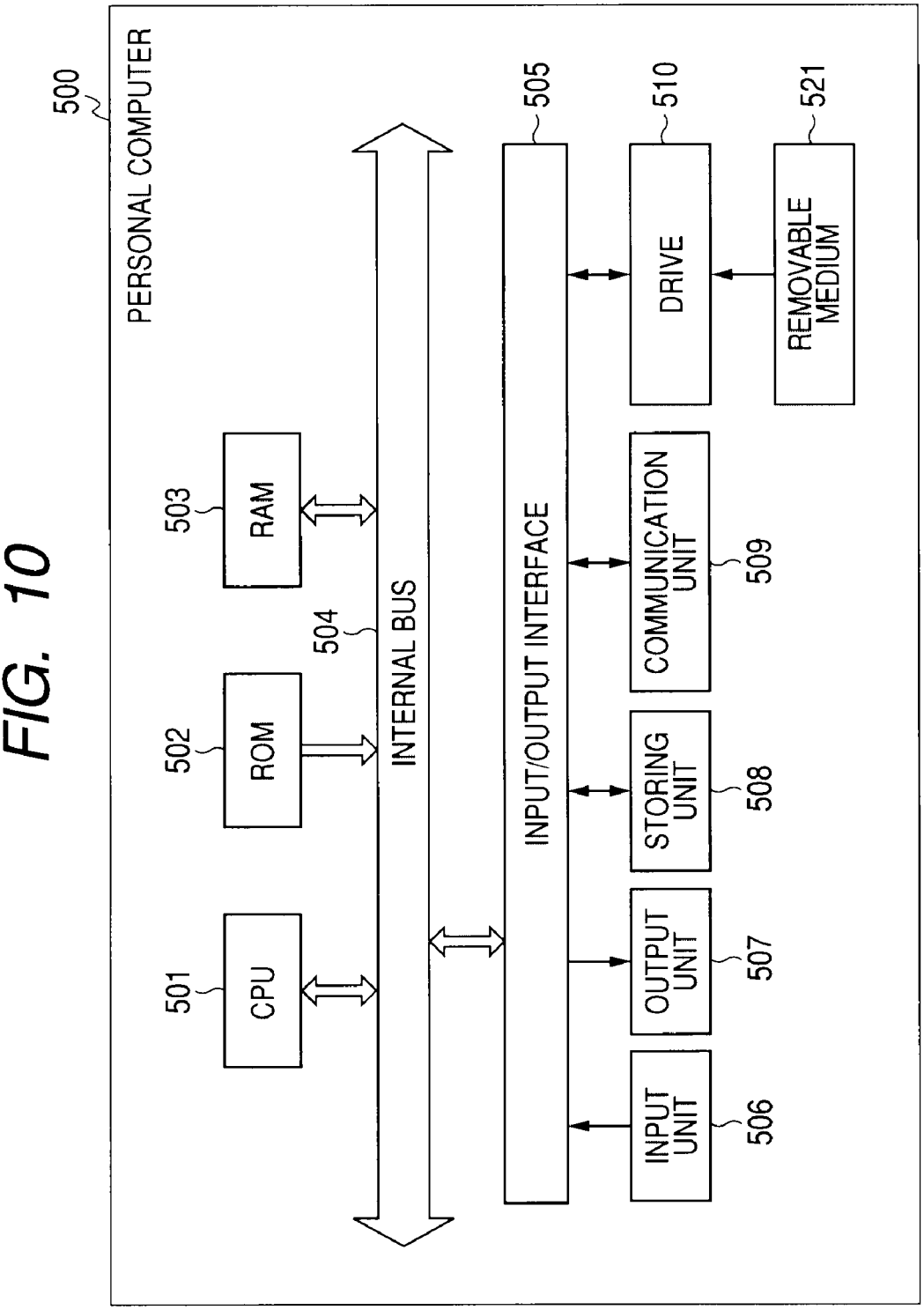
FIG. 10 is a block diagram of a configuration of a personal computer.

In FIG. 10, a CPU (Central Processing Unit) 501 executes various kinds of processing according to programs stored in a ROM (Read Only Memory) 502 or programs loaded from a storing unit 508 to a RAM (Random Access Memory) 503. Data and the like necessary when the CPU 501 executes the various kinds of processing are also stored in the RAM 503.

The CPU 501, the ROM 502, and the RAM 503 are connected to one another via an internal bus 504. An input/output interface 505 is also connected to the internal bus 504.

An operation input unit including a keyboard and a mouse or an input unit 506 including an imaging device such as a camera, a display including a CRT or an LCD, an output unit 507 including a speaker, a storing unit 508 including a hard disk, and a communication unit 509 including a modem and a terminal adapter are connected to the input/output interface 505. The communication unit 509 performs communication processing via various networks including a telephone line and a CATV.

A drive 510 is also connected to the input/output interface 505 when necessary. A removable medium 521 including a magnetic disk, an optical disk, a magneto-optical disk, or a semiconductor memory is inserted in the drive 510 as appropriate. A computer program read out from the removable medium 521 is installed in the storing unit 508 when necessary.

When the series of processing is executed by the software, the program for the software is installed from a network or a recording medium.

This recording medium includes not only a package medium including the removable medium 521, in which programs are recorded, distributed to provide the user with the programs separately from the computer but also hard disk or the like including the ROM 502 an the storing unit 508, in which programs are recorded, provided to the user in a state incorporated in an apparatus main body in advance.

In the personal computer 500 that executes the software for executing the series of processing, the recognition processing described above can be applied to, for example, applications described below.

In the personal computer 500, gestures stored therein (in the storing unit 508 that stores, in association with the dictionary registering unit 61, model actions in a form that can be referred to during recognition processing) are associated in advance with commands for operating the software executed by the personal computer 500. The user can uniquely register the gestures as actions included in the model moving image. For example, the user can register up and down gestures of the hand in association with a command for instructing scroll of an execution window of a browser, a word processor, or the like.

In the personal computer 500, an image of the user using the personal computer 500 is picked up by the camera (corresponding to the input-moving-image buffering unit 62) of the input unit 506 set near the display of the output unit 507. The image is used as an input moving image. The CPU 501 that can realize functions corresponding to the pre-processing executing unit 63, the feature-point extracting unit 64, the feature-quantity extracting unit 65, the feature-quantity comparing unit 66, the posture-parameter estimating unit 67, and the recognition-result generating unit 68 executes recognition processing for the gestures uniquely registered by the user and stored therein (the storing unit 508).

For example, the gestures are sequentially recognized while the software corresponding thereto such as the browser or the word processor is running. For example, when the registered gesture such as up and down of the hand is detected, command processing corresponding to the gesture is executed.

Processing for storing the gestures in the storing unit 508 may be executed by the personal computer 500 in advance or may be executed in another apparatus and obtained model actions may be stored in the storing unit 508 in a form that can be referred to during recognition processing.

In this specification, steps describing the programs recorded in the recording medium include not only processing executed in time series according to described order but also processing executed in parallel or individually, although not always executed in time series.

In this specification, the system represents an entire apparatus including plural apparatuses.

Embodiments of the present invention are not limited to the embodiment described above. Various alterations of the embodiment are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus that recognizes whether a registered action is included in an input moving image, the information processing apparatus comprising:

storing means for storing information concerning model feature points, which are feature points at the time when a model moving image including models for recognizing an action is set as three dimensions including an image plane and time, and model feature quantities, which are feature quantities at the model feature points;

first acquiring means for acquiring the input moving image;

first feature-point extracting means for extracting, with the input moving image acquired by the first acquiring means set as three dimensions including an image plane and time, input feature points, which are feature points for recognizing the action, from the input moving image;

first feature-quantity extracting means for extracting input feature quantities, which are feature quantities at the input feature points extracted by the first feature-point extracting means;

feature-quantity comparing means for comparing the input feature quantities extracted by the first feature-quantity extracting means and the model feature quantities stored by the storing means and generating candidate corresponding feature point pairs as sets of feature points having similar feature quantities;

posture estimating means for removing outliers from the candidate corresponding feature point pairs obtained as a result of the comparison by the feature-quantity comparing means, estimating postures of the models on the input moving image, and obtaining a recognition corresponding feature point pair group corresponding to the postures of the models; and recognition-result generating means for generating a recognition result on the basis of an estimation result of postures of the models obtained by the posture estimating means and the recognition corresponding feature point pair group.

2. An information processing apparatus according to claim 1, wherein the posture estimating means projects, onto a parameter space, an image transformation parameter for determining a positional posture in three dimensions including an image plane and time of the model moving image determined by N sets of the candidate corresponding feature point pairs selected at random, obtains a cluster having a largest number of members among clusters formed by performing clustering on the parameter space, and sets the candidate corresponding feature point pairs, which are members of the cluster having the largest number of members, as the recognition corresponding feature point pair group.

3. An information processing apparatus according to claim 2, wherein the posture estimating means detects a centroid of the cluster having the largest number of members and estimates postures of the models using the centroid as a parameter corresponding to the postures.

4. An information processing apparatus according to claim 2, wherein the posture estimating means performs clustering on the parameter space according to an NN method.

5. An information processing apparatus according to claim 2, wherein the image transformation parameter is an affine parameter.

6. An information processing apparatus according to claim 5, wherein the posture estimating means normalizes a range of the affine parameter and projects the normalized affine parameter onto the parameter space.

7. An information processing apparatus according to claim 6, wherein the posture estimating means normalizes the range of the affine parameter by setting a normalization coefficient of nine-dimensional parameters for determining rotation, expansion and reduction, and shearing deformation, respectively, to 1.0, setting a normalization coefficient of a parameter concerning translation in a horizontal direction among three-dimensional parameters for determining translation as an inverse number of the number of horizontal pixels of an assumed moving image, setting a normalization coefficient of a parameter concerning translation in a vertical direction as an inverse number of the number of vertical pixels of the assumed moving image, setting a normalization coefficient of a parameter concerning translation in a time direction as an inverse number of time length of the assumed moving image, and multiplying the affine parameter with these normalization coefficients.

8. An information processing apparatus according to claim 6, wherein the posture estimating means executes clustering using a first threshold of a distance serving as a clustering reference for nine-dimensional parameters for determining rotation, expansion and reduction, and shearing deformation, respectively, and a second threshold of a distance serving as a clustering reference for three-dimensional parameters for determining translation, and the second threshold is larger than the first threshold.

9. An information processing apparatus according to claim 2, wherein the recognition-result generating means sets, as a recognition result, a least square estimation result of the image transformation parameter of the models in which the numbers of elements of the recognition corresponding feature point pair group obtained by the posture estimating means are equal to or larger than a predetermined threshold.

10. An information processing apparatus according to claim 1, wherein the first feature-point extracting means extracts, as the input feature points in the input moving image, a three-dimensional coordinate of an image plane and time that gives a maximum and a minimum of a Harris function H extended to the three dimensions including an image plane and time.

11. An information processing apparatus according to claim 1, wherein the first feature-quantity extracting means extracts, for each of the three dimensions including an image plane and time, feature vectors including image information subjected to a partial differential Gaussian operation up to a fourth order as the input feature quantities.

12. An information processing apparatus according to claim 1, wherein the feature-quantity comparing means generates the candidate corresponding feature point pairs using a norm of the input feature quantities and the model feature quantities as a scale of a non-similarity degree between the input feature quantities and the model feature quantities.

13. An information processing apparatus according to claim 1, wherein the recognition-result generating means sets, as a recognition result of a model including the registered action, the models in which the numbers of elements of the recognition corresponding feature point pair group obtained by the posture estimating means are equal to or larger than a predetermined threshold.

14. An information processing apparatus according to claim 1, wherein the recognition-result generating means sorts, in order from one with a largest number of elements, the models in which the numbers of elements of the recognition corresponding feature point pair group obtained by the posture estimating means are equal to or larger than a predetermined threshold, and sets all detected models and order of the models as a recognition result of a model including the registered action.

15. An information processing apparatus according to claim 1, wherein the recognition-result generating means sets, as a reliability degree of the models in which the numbers of elements of the recognition corresponding feature point pair group are equal to or larger than a predetermined threshold, a ratio of the number of elements of the recognition corresponding feature point pair group of the respective models with respect to a sum of the numbers of the models in which the numbers of elements of the recognition corresponding feature quantity point pair group obtained by the posture estimating means are equal to or larger than the predetermined threshold.

16. An information processing apparatus according to claim 1, wherein the recognition-result generating means sets, as a recognition result, an estimation result of postures of the models obtained by the posture estimating means.

17. An information processing apparatus according to claim 1, further comprising dividing means for dividing the input moving image acquired by the first acquiring means into an area corresponding to the models and an area corresponding to a background, wherein
the first feature-point extracting means extracts the input feature points from the area corresponding to the models in the input moving image divided by the dividing means.

18. An information processing apparatus according to claim 1, further comprising:
second acquiring means for acquiring the model moving image formed in the three dimensions including an image plane and time;
second feature-point extracting means for extracting the model feature points, which are feature points for recognizing the action in the model moving image at the time when the model moving image is set as the three dimensions including an image plane and time; and
second feature-quantity extracting means for extracting the model feature quantities, which are feature quantities at the model feature points extracted by the second feature-point extracting means.

19. An information processing apparatus according to claim 18, further comprising dividing means for dividing the model moving image acquired by the second acquiring means into an area corresponding to the models and an area corresponding to a background, wherein
the second feature-point extracting means extracts the model feature points from the area corresponding to the model in the model moving image divided by the dividing means.

20. An information processing apparatus according to claim 19, wherein the dividing means applies morphological contraction processing to an area as a candidate of the area corresponding to the models after applying expansion processing thereto and determines the area corresponding to the models.

21. An information processing method for an information processing apparatus including a storing unit that stores information concerning model feature points, which are feature points at the time when a model moving image including models for recognizing an action is set as three dimensions including an image plane and time, and model feature quantities, which are feature quantities at the model feature points, the information processing apparatus recognizing whether the registered action is included in an input moving image, the information processing method comprising the steps of:
acquiring the input moving image;
extracting, with the input moving image set as three dimensions including an image plane and time, input feature points, which are feature points for recognizing the action from the input moving image;
extracting input feature quantities, which are feature quantities at the input feature points;
comparing the input feature quantities and the model feature quantities stored in the storing unit and generating candidate corresponding feature point pairs as sets of feature points having similar feature quantities;
removing outliers from the candidate corresponding feature point pairs, estimating postures of the models on the input moving image, and obtaining a recognition corresponding feature point pair group corresponding to the postures of the models; and
generating a recognition result on the basis of an estimation result of postures of the models and the recognition corresponding feature point pair group.

22. A non-transitory computer-readable medium including a computer program for causing a computer to execute processing for recognizing whether the registered action is included in an input moving image using information concerning model feature points, which are feature points at the time when a model moving image including models for recognizing an action stored in a predetermined storing unit is set as three dimensions including an image plane and time, and model feature quantities, which are feature quantities at the model feature points, the computer program causing the computer to execute processing comprising the steps of:

acquiring the input moving image;

extracting, with the input moving image set as three dimensions including an image plane and time, input feature points, which are feature points for recognizing the action from the input moving image;

extracting input feature quantities, which are feature quantities at the input feature points;

comparing the input feature quantities and the model feature quantities stored in the storing unit and generating candidate corresponding feature point pairs as sets of feature points having similar feature quantities;

removing outliers from the candidate corresponding feature point pairs, estimating postures of the models on the input moving image, and obtaining a recognition corresponding feature point pair group corresponding to the postures of the models; and generating a recognition result on the basis of an estimation result of postures of the models and the recognition corresponding feature point pair group.

23. An information processing apparatus that generates, in performing processing for recognizing whether a predetermined action is included in an input moving image, information indicating features of the action used in the processing, the information processing apparatus comprising:

acquiring means for acquiring a model moving image;

feature-point extracting means for extracting model feature points, which are feature points for recognizing models for recognizing the action in the model moving image at the time when the model moving image is set as three dimensions including an image plane and time;

feature-quantity extracting means for extracting model feature quantities, which are feature quantities at the model feature points extracted by the feature-point extracting means; and dividing means for dividing the model moving image acquired by the acquiring means into an area corresponding to the models and an area corresponding to a background, wherein the feature-point extracting means extracts the model feature points from the area corresponding to the models in the model moving image divided by the dividing means, and the dividing means applies morphological contraction processing to an area as a candidate of the area corresponding to the models after applying expansion processing thereto and determines the area corresponding to the models.

24. An information processing apparatus according to claim 23, wherein the feature-point extracting means extracts, as the model feature point in the input moving image, a three-dimensional coordinate that gives a maximum and a minimum of a Harris function H extended to three dimensions including an image plane and time.

25. An information processing apparatus according to claim 23, wherein the feature-quantity extracting means extracts, for each of the three dimensions including an image plane and time, feature vectors including image information subjected to a partial differential Gaussian operation up to a fourth order as the model feature quantities.

26. An information processing method for an information processing apparatus that generates, in performing processing for recognizing whether a predetermined action is included in an input moving image, information indicating features of the action used in the processing, the information processing method comprising the steps of:

acquiring a model moving image;

extracting model feature points, which are feature points for recognizing models for recognizing the action in the model moving image at the time when the model moving image is set as three dimensions including an image plane and time;

extracting model feature quantities, which are feature quantities at the model feature points; and dividing the acquired model moving image into an area corresponding to the models and an area corresponding to a background, wherein the extracting model feature points includes extracting the model feature points from the area corresponding to the models in the model moving image divided by the dividing, and the dividing includes applying morphological contraction processing to an area as a candidate of the area corresponding to the models after applying expansion processing thereto and determining the area corresponding to the models.

27. A non-transitory computer-readable medium including a computer program for causing a computer to execute processing for generating, in performing processing for recognizing whether a predetermined action is included in an input moving image, information indicating features of the action used in the processing, the computer program causing the computer to execute processing comprising the steps of:

acquiring a model moving image;

extracting model feature points, which are feature points for recognizing models for recognizing the action in the model moving image at the time when the model moving image is set as three dimensions including an image plane and time; and extracting model feature quantities, which are feature quantities at the model feature points; and dividing the acquired model moving image into an area corresponding to the models and an area corresponding to a background, wherein the extracting model feature points includes extracting the model feature points from the area corresponding to the models in the model moving image divided by the dividing, and the dividing includes applying morphological contraction processing to an area as a candidate of the area corresponding to the models after applying expansion processing thereto and determining the area corresponding to the models.

28. An information processing apparatus that recognizes whether a registered action is included in an input moving image, the information processing apparatus comprising:

a storing unit configured to store information concerning model feature points, which are feature points at the time when a model moving image including models for recognizing an action is set as three dimensions including an image plane and time, and model feature quantities, which are feature quantities at the model feature points;

a first acquiring unit configured to acquire the input moving image;

a first feature-point extracting unit configured to extract, with the input moving image acquired by the first acquiring unit set as three dimensions including an image plane and time, input feature points, which are feature points for recognizing the action, from the input moving image;

a first feature-quantity extracting unit configured to extract input feature quantities, which are feature quantities at the input feature points extracted by the first feature-point extracting unit;

a feature-quantity comparing unit configured to compare the input feature quantities extracted by the first feature-quantity extracting unit and the model feature quantities stored by the storing unit and generate candidate corresponding feature point pairs as sets of feature points having similar feature quantities;

a posture estimating unit configured to remove outliers from the candidate corresponding feature point pairs obtained as a result of the comparison by the feature-quantity comparing unit, estimate postures of the models on the input moving image, and obtain a recognition corresponding feature point pair group corresponding to the postures of the models; and a recognition-result generating unit configured to generate a recognition result on the basis of an estimation result of postures of the models obtained by the posture estimating unit and the recognition corresponding feature point pair group.

29. An information processing apparatus that generates, in performing processing for recognizing whether a predetermined action is included in an input moving image, information indicating features of the action used in the processing, the information processing apparatus comprising:

an acquiring unit configured to acquire a model moving image;

a feature-point extracting unit configured to extract model feature points, which are feature points for recognizing models for recognizing the action in the model moving image at the time when the model moving image is set as three dimensions including an image plane and time; and a feature-quantity extracting unit configured to extract model feature quantities, which are feature quantities at the model feature points extracted by the feature-point extracting unit; and a dividing unit configured to divide the model moving image acquired by the acquiring unit into an area corresponding to the models and an area corresponding to a background, wherein the feature-point extracting unit extracts the model feature points from the area corresponding to the models in the model moving image divided by the dividing unit, and the dividing unit applies morphological contraction processing to an area as a candidate of the area corresponding to the models after applying expansion processing thereto and determines the area corresponding to the models.

* * * * *